US008472163B2

(12) United States Patent
Kazaryan et al.

(10) Patent No.: US 8,472,163 B2
(45) Date of Patent: Jun. 25, 2013

(54) NEGATIVE ELECTRODE CURRENT COLLECTOR FOR HETEROGENEOUS ELECTROCHEMICAL CAPACITOR AND METHOD OF MANUFACTURE THEREOF

(75) Inventors: Samvel Avakovich Kazaryan, Troitsk (RU); Gamir Galievich Kharisov, Troitsk (RU); Vladimir Alexandrovich Kazarov, Troitsk (RU); Sergey Nikolaevich Razumov, Moscow (RU); Sergey Vitalievich Litvinenko, Zelenograd (RU)

(73) Assignee: Universal Supercapacitors LLC, Columbus, OH (US)

( * ) Notice: Subject to any disclaimer, the term of this patent is extended or adjusted under 35 U.S.C. 154(b) by 446 days.

(21) Appl. No.: 12/033,820

(22) Filed: Feb. 19, 2008

(65) Prior Publication Data
US 2008/0218938 A1 Sep. 11, 2008

Related U.S. Application Data

(60) Provisional application No. 60/890,581, filed on Feb. 19, 2007.

(51) Int. Cl.
*H01G 9/00* (2006.01)
(52) U.S. Cl.
USPC .......................................... 361/502; 361/503
(58) Field of Classification Search
USPC .................................................. 361/502–503
See application file for complete search history.

(56) References Cited

U.S. PATENT DOCUMENTS

| | | | |
|---|---|---|---|
| 4,023,079 A * | 5/1977 | Selover et al. ................ 361/502 |
| 4,562,511 A | 12/1985 | Nishino et al. |
| 5,045,170 A | 9/1991 | Bullock et al. |
| 5,065,286 A | 11/1991 | Kurabayashi et al. |
| 5,072,335 A | 12/1991 | Kurabayashi et al. |
| 5,072,336 A | 12/1991 | Kurabayashi et al. |
| 5,072,337 A | 12/1991 | Kurabayashi et al. |
| 5,080,963 A | 1/1992 | Tatarchuk et al. |
| 5,099,398 A | 3/1992 | Kurabayashi et al. |
| 5,102,745 A | 4/1992 | Tatarchuk et al. |
| 5,121,301 A | 6/1992 | Kurabayashi et al. |
| 5,142,451 A | 8/1992 | Kurabayashi et al. |
| 5,187,033 A | 2/1993 | Koshiba |
| 5,262,254 A | 11/1993 | Koksbang et al. |
| 5,304,330 A | 4/1994 | Tatarchuk et al. |
| 5,369,547 A | 11/1994 | Evans |
| 5,441,830 A | 8/1995 | Moulton et al. |
| 5,464,453 A | 11/1995 | Tong et al. |
| 5,464,706 A | 11/1995 | Dasgupta et al. |

(Continued)

FOREIGN PATENT DOCUMENTS
CA 2137323 9/1999
WO 96/12313 4/1996

*Primary Examiner* — Eric Thomas
(74) *Attorney, Agent, or Firm* — Standley Law Group LLP

(57) ABSTRACT

A current collector for use in an electric double layer electrochemical capacitor having a sulfuric acid electrolyte. The current collector uses a conducting carbon (e.g., graphite foil) basis with p-type conductivity. A protective film covers at least a portion of the graphite foil basis. The protective film is comprised of a conducting composite material made with a conducting carbon and a conducting organic polymer with p-type conductivity. The protective film is grown on the current collector basis such that it preferably fills the pores of the current collector basis. A lug portion of the current collector basis may be protected with an insulating polymer material.

21 Claims, 12 Drawing Sheets

U.S. PATENT DOCUMENTS

| | | | |
|---|---|---|---|
| 5,464,707 A | 11/1995 | Moulton et al. | |
| 5,478,676 A | 12/1995 | Turi et al. | |
| 5,518,839 A | 5/1996 | Olsen | |
| 5,527,640 A | 6/1996 | Rudge et al. | |
| 5,547,782 A | 8/1996 | Dasgupta et al. | |
| 5,555,155 A * | 9/1996 | Patel et al. | 361/503 |
| 5,578,396 A | 11/1996 | Fauteux et al. | |
| 5,578,399 A | 11/1996 | Olsen | |
| 5,580,686 A | 12/1996 | Shi et al. | |
| 5,604,660 A | 2/1997 | Bai et al. | |
| 5,621,607 A | 4/1997 | Farahmandi et al. | |
| 5,777,428 A | 7/1998 | Farahmandi et al. | |
| 5,824,436 A | 10/1998 | Lian et al. | |
| 5,955,215 A | 9/1999 | Kurzwell et al. | |
| 6,031,711 A | 2/2000 | Tennent et al. | |
| 6,134,760 A * | 10/2000 | Mushiake et al. | 29/25.03 |
| 6,152,970 A | 11/2000 | Wei et al. | |
| 6,201,685 B1 | 3/2001 | Jerabek et al. | |
| 6,201,686 B1 | 3/2001 | Hiratsuka et al. | |
| 6,335,857 B1 | 1/2002 | Takimoto et al. | |
| 6,335,858 B1 | 1/2002 | Vasechkin et al. | |
| 6,341,057 B1 | 1/2002 | Nissen et al. | |
| 6,349,027 B1 | 2/2002 | Suhara et al. | |
| 6,379,402 B1 | 4/2002 | Suhara et al. | |
| 6,383,427 B2 | 5/2002 | Ishikawa et al. | |
| 6,402,792 B1 | 6/2002 | Hiratsuka et al. | |
| 6,426,862 B1 | 7/2002 | Vasechkin et al. | |
| 6,430,031 B1 | 8/2002 | Dispennette et al. | |
| 6,491,789 B2 | 12/2002 | Niu | |
| 6,493,210 B2 | 12/2002 | Nonaka et al. | |
| 6,503,432 B1 | 1/2003 | Barton et al. | |
| 6,576,365 B1 | 6/2003 | Meitav et al. | |
| 6,631,074 B2 | 10/2003 | Bendale et al. | |
| 6,706,079 B1 | 3/2004 | Shmatko et al. | |
| 6,731,022 B2 | 5/2004 | Silverman | |
| 6,773,468 B2 | 8/2004 | Lang | |
| 6,830,595 B2 | 12/2004 | Reynolds | |
| 6,855,273 B2 | 2/2005 | Ravet et al. | |
| 6,864,147 B1 | 3/2005 | Fife et al. | |
| 6,937,460 B2 | 8/2005 | Lang | |
| 6,962,666 B2 | 11/2005 | Ravet et al. | |
| 7,209,341 B2 * | 4/2007 | Yoshitake et al. | 361/502 |
| 7,312,976 B2 | 12/2007 | Kazaryan et al. | |
| 7,443,650 B2 * | 10/2008 | Nedoshivin et al. | 361/502 |
| 2003/0070916 A1 | 4/2003 | Nanno et al. | |
| 2004/0081878 A1 | 4/2004 | Mardilovich | |
| 2004/0120100 A1 | 6/2004 | Reynolds | |
| 2004/0131944 A1 | 7/2004 | Visco et al. | |
| 2004/0140458 A1 | 7/2004 | Ravet et al. | |
| 2004/0141282 A1 | 7/2004 | Hudis | |
| 2004/0191617 A1 | 9/2004 | Visco et al. | |
| 2004/0197641 A1 | 10/2004 | Visco et al. | |
| 2005/0002150 A1 | 1/2005 | Volfkovich et al. | |
| 2005/0007727 A1 | 1/2005 | Lang | |
| 2005/0019656 A1 | 1/2005 | Yoon et al. | |
| 2005/0089754 A1 | 4/2005 | Lang | |
| 2005/0141170 A1 | 6/2005 | Honda et al. | |
| 2005/0147877 A1 | 7/2005 | Tarnowski et al. | |
| 2005/0271798 A1 | 12/2005 | Zhong et al. | |
| 2006/0291139 A1 | 12/2006 | Nedoshivin et al. | |
| 2006/0292384 A1 | 12/2006 | Kazaryan et al. | |
| 2010/0040950 A1 * | 2/2010 | Buiel et al. | 429/211 |

* cited by examiner

| HES | Parameters | | | | | | |
|---|---|---|---|---|---|---|---|
| | Mass of dry carbon plates (g) | $Q_{ch}$ (A·h) | $E_{ch}$ (kJ) | $Q_d$ (A·h) | $E_d$ (kJ) | $Q_{res}$ (A·h) | $E_{res}$ (kJ) |
| #1 | 21.6 | 2.45 | 17.4 | 2.34 | 12.2 | 2.00 | 9.43 |
| #2 | 21.6 | 2.41 | 17.1 | 2.28 | 11.9 | 1.86 | 8.60 |
| #3 | 22.3 | 2.75 | 20.4 | 2.45 | 12.6 | 2.15 | 9.91 |
| #4 | 22.6 | 3.00 | 22.46 | 2.40 | 12.31 | 2.12 | 9.94 |

NEGATIVE ELECTRODE CURRENT COLLECTOR FOR HETEROGENEOUS ELECTROCHEMICAL CAPACITOR AND METHOD OF MANUFACTURE THEREOF

This application claims the benefit of U.S. Provisional Application No. 60/890,581, filed on Feb. 19, 2007 which is expressly incorporated by reference in its entirety herein.

BACKGROUND OF THE INVENTION

The present invention is directed to the technology and manufacture of current collectors for electrochemical capacitors and, more particularly, electric double layer (EDL) capacitors. A current collector of the present invention can be used to manufacture electrochemical capacitors having high specific energies and stable energy characteristics.

Electrochemical capacitor current collectors (hereinafter current collectors) have generally been constructed of metals and metal alloys that are stable in specific aqueous and non-aqueous electrolytes. Such metals may include, for example, Al, Ti, Ni, Ag, Nb, Ta, W, Pb and Cu. Notwithstanding such a wide range of metals that may be used in current collectors, many of said materials cannot provide for a wide range of capacitor operating voltages. This is typical, in particular, of capacitors having an aqueous electrolyte. As a result, capacitors employing current collectors of said materials may experience a deterioration of energy and capacity parameters, may have a greater cost of stored energy and, therefore, may be restricted in their application.

The high cost of most of the aforementioned metals is another negative aspect of the use of said metals and their alloys in the manufacture of current collectors. Furthermore, in order to reduce self-discharge, stabilize energy parameters and increase the cycle life of an associated capacitor, high purity versions of said metals are used in current collectors. This impedes development of the technology related to the manufacture of electrochemical capacitors and makes such capacitors difficult to mass produce.

Currently, various activated carbon materials most commonly serve as the active mass of polarizable negative electrochemical capacitor electrodes—whether used with an aqueous or non-aqueous electrolyte. When selecting/manufacturing current collectors for use with electrochemical capacitor electrodes having an activated carbon active mass, the following basic factors are typically taken into consideration: the electrophysical, electric and electrochemical parameters of the current collectors and active material; the operating range of electrode potentials; the properties of the electrolyte used; the operating temperature; the stability of parameters during operation; cycle life; and cost.

Various metals and metal alloys whose surfaces are protected from any negative effects of the electrolyte are often used as current collectors for electrodes having an activated carbon active mass. Application of various electrolyte-stable conductive coatings to the surfaces of a current collector is a commonly used method of protection thereof.

Electrochemical capacitors may also include one or more non-polarizable positive electrodes, such as those made from lead dioxide. Materials commonly used to manufacture a current collector for such a lead dioxide electrode, particularly when said electrode is used with an aqueous sulfuric acid electrolyte, may include for example: (a) lead and its alloys; (b) various alloys of lead with a protective coating; and (c) steel with a protective coating made of graphite foil impregnated by acid resistant varnish. These current collectors may also be used in the manufacture of symmetrical electrochemical capacitors with polarizable carbon electrodes and an aqueous sulfuric acid electrolyte.

A thin layer of material with high specific resistance and unstable electrical parameters will form on work surfaces of lead and lead alloy-based based current collectors after a long period of operation in an aqueous sulfuric acid electrolyte. The use of current collectors with such a layer can cause a degradation in the energy and power parameters, stability of operation, reliability and cycle life of a capacitor.

Thus, in order to ensure that an electrochemical capacitor will have a long service life and highly stable power parameters, there exist stringent requirements with respect to protective coatings for shielding current collectors against degradation from contact with certain electrolytes. On the one hand, it can be understood that it would be difficult to develop a universal protective coating with parameters appropriate to every capacitor. On the other hand, for each specific capacitor (out of a great number of types of these devices) it is generally necessary to develop a special protective coating that is compatible with all the specific properties of the capacitor. This brings about a considerable increase in the cost of an associated current collector, and of the capacitor as a whole. Further, many known protective coatings simply cannot impart a long service life and stable of energy and power parameters to most capacitors and, particularly, to capacitors having aqueous electrolytes.

Current collectors based on steel with graphite foil protective coatings are also known. While these current collectors also have certain drawbacks, the elimination of said drawbacks would make it possible to considerably improve the energy and power parameters of a capacitor and, more importantly, improve its cycle life.

One such known current collector consists of a steel sheet, and a graphite foil protective coating of approximately 0.3 mm thickness that is impregnated by an acid resistant polymer. The protective coating is glued in several spots to a steel basis of the current collector. Following the assembly of a capacitor with this current collector, the capacitor is sealed to ensure that the electrolyte has no contact with the steel basis of the current collector.

The graphite foil that forms the protective coating of this known current collector has a porous structure. In order to prevent infiltration of electrolyte to the surface of the steel basis of the current collector, the pores of the foil are filled with a polymer varnish that is stable in the selected electrolyte. Inasmuch as the protective coating is glued to the steel basis of the current collector in only a few spots, even a single through-pore or micro fracture in the protective coating will be sufficient to allow the electrolyte to gradually penetrate the entire surface of the steel current collector material. The contact of the electrolyte with the steel basis of the current collector will, undoubtedly, bring about dissolution and breakup thereof. During this dissolution and breakup, the transfer to the electrolyte of iron ions and other components of which the steel basis is composed will cause a dramatic increase in the self-discharge current of the capacitor to which the current collector is installed, as well as a decrease in the energy parameters of the capacitor and an accelerated failure thereof.

Other obvious drawbacks of this known current collector include the fact that the graphite foil of the protective coating has a small electric capacity and, when electrolyte gets into its pores, the foil starts to partially perform as an active material in the charge/discharge process of the capacitor. Over a long period of operation, this process brings about swelling, deterioration of mechanical parameters, and a partial or total breakup of the graphite foil structure. The result is an increase in the electric resistance of the current collector and of the capacitor as a whole.

It should also be noted that when impregnating the graphite foil of the protective coating of this known current collector with a non-conducting polymer, the polymer makes contact with the carbon particles of the foil and increases its electric resistance. This also increases the electric resistance of the current collector and of an associated capacitor as a whole.

The particular design of the current collector itself is another drawback of this known current collector. That is, this known current collector is designed for use in a capacitor having one positive electrode plate and two negative electrode plates. Consequently, this known current collector is not amenable to use in a capacitor with a different number of positive and/or negative electrode plates connected in parallel. Therefore, this current collector cannot be used to create capacitors of high electric capacity and acceptable energy and power parameters. The use of parallel and series cell connection in order to obtain a capacitor module with high stored energy will actually bring about a significant reduction in the specific energy and power parameters of a capacitor that has only one positive electrode plate. Therefore, it can be understood that such an electrochemical capacitor employing this known current collector would have a low specific energy, low reliability, unstable energy parameters, a high energy storage cost, and a short service life. The low specific parameters of such a capacitor would significantly limit the scope of its application.

It is known that the contact resistance between the active material of an electrode and its current collector plays an important role in ensuring that an electrochemical capacitor exhibits stable energy and power parameters. The electric resistance between the materials of the electrode and its current collector are directly dependent on the electrophysical parameters of the materials and the electrolyte used. Electrons are transferred from the active mass of the electrode to the current collector and/or from the current collector to the active mass of the electrode during the charging and discharge of a capacitor. Consequently, in order to obtain high power and stable parameters of the capacitor, it is necessary to ensure a minimum height of the energy barrier of the electric charge transfer and to ensure that it does not change during capacitor operation.

The active materials (i.e., activated carbon powders) that are typically used for the manufacture of polarizable electrochemical capacitor electrodes are mainly degenerate p-type semiconductors, whose Fermi level ($E_F$) is in the valence band. During the charge and discharge of capacitors having such electrodes, there occur changes in charge carrier concentration in the near-surface layer of the pore walls of the active mass, as well as in the area of contact between the active mass of the electrode and the current collector. This causes a change in the conductivity value of the active mass, and the rate of such change depends on the depth of charge and discharge of the capacitor. The conductivity of electrodes of capacitors having high specific electric capacity during their charge and discharge changes in a wide range.

As can be observed in FIG. 1, during high polarization of a capacitor's electrode (in order to obtain high voltage and energy), there occurs a change of the type of conductivity present in the surface layers of the electrode. This change occurs in the area of contact between the active mass 1 of the electrode and the current collector 2, from the side of the active mass, and in the near-surface layers 3 of the walls of its pores 5. This figure shows that during significant distortion of the zones in the area of contact having δ thickness (and in the near-surface layers of the walls of the pores of the active mass), the Fermi level $E_f$ is above the bottom of the conductivity zone. This implies that the material in this area is a degenerate material of p-type conductivity. This brings about the occurrence of a p-n junction in the contact area along the side of the active mass. The thickness and distribution of the volume of the spatial charge of the p-n junction depends on the electrophysical parameters of the solid electrode material, the electrolyte 4, and the potential of the electrode.

SUMMARY OF THE INVENTION

It is obvious from the foregoing discussion that the parameters of the p-n junction change significantly during the process of charge and discharge of a capacitor. When use is made of a current collector material whose electrophysical parameters are considerably different from the electrophysical parameters of the active mass of the electrode, there occurs a heterojunction in the area of contact between the active mass and the current collector. When use is made of a current collector material having electrophysical parameters that are similar to the electrophysical parameters of active mass of the electrode, there occurs a homojunction in the area of contact between the active mass and the current collector. It is well known that a homojunction exhibits reduced resistance in comparison to a heterojunction.

Insofar as the forbidden zone of carbon materials is very narrow, the thickness of the contact area between the active mass of a carbon-based electrode and its current collector is relatively small, and the transfer of the electric charge in this area is carried out mostly by tunneling. Therefore, in order to obtain a low and stable energy barrier during the transfer of the electric charge from a carbon-based active mass to the current collector, it is preferable that the current collector material have electrophysical properties similar to those of the carbon-based active mass. Consequently, highly conducting carbon materials of p-type conductivity are most suitable for use in current collectors of carbon-based capacitor electrodes.

Many carbon materials having good stability in various electrolytes (including aqueous sulfuric acid electrolyte), low specific electric resistance, high overpotential of oxygen evolution, and low mass density, are readily available on the open market. Flexible graphite foil, which is mainly produced by the rolling of thermally expanded carbon powders, belongs to this range of carbon materials. For example, the specific electric resistance of the graphite foil known as Grafoil™ is in the range of $10^{-4}$ to $2 \cdot 10^{-2}$ Ohm·cm. The content of impurities in this Grafoil™ graphite foil, the transfer of which to the electrolyte may be accompanied by a deterioration in the energy parameters of a capacitor, is rather low. Such Graphite foil has sufficient elasticity to allow for manufacture of capacitors of different configuration.

The use of flexible graphite foil to protect the basis of a capacitor current collector from mechanical damage during extended operation in a damaging electrolyte, is a novel solution aimed at increasing operational parameters of current collectors and associated electrochemical capacitors (with aqueous and non-Electrochemical aqueous electrolytes). Thus, a current collector of the present invention is capable of ensuring low and stable contact resistance with the active mass of its electrode, is preferably based on an activated carbon powder(s), may be used with asymmetric and symmetric electrochemical capacitors with aqueous and non-aqueous electrolytes, and imparts enhanced operational and cycle life parameters to its associated capacitor. The use of a current collector of the present invention in the manufacture of electrochemical capacitors designed to provide high levels of stored energy makes it possible to considerably increase the specific energy and capacity parameters of such capacitors and to enhance their sphere of application.

A current collector of the present invention may be used as a current collector(s) of a positive or negative electrode of a symmetric electrochemical capacitors, and/or as a current collector(s) of a polarizable positive and polarizable negative electrode(s) of an asymmetric electrochemical capacitor.

A better understanding of a current collector of the present invention that may be used in an electric double layer (EDL) electrochemical capacitor can be gained by a reading of the following general description of such a current collector and by the more detailed description of certain exemplary embodiments of such current collectors and their technology of manufacture.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF THE EXEMPLARY EMBODIMENT(S)

Figure 1:
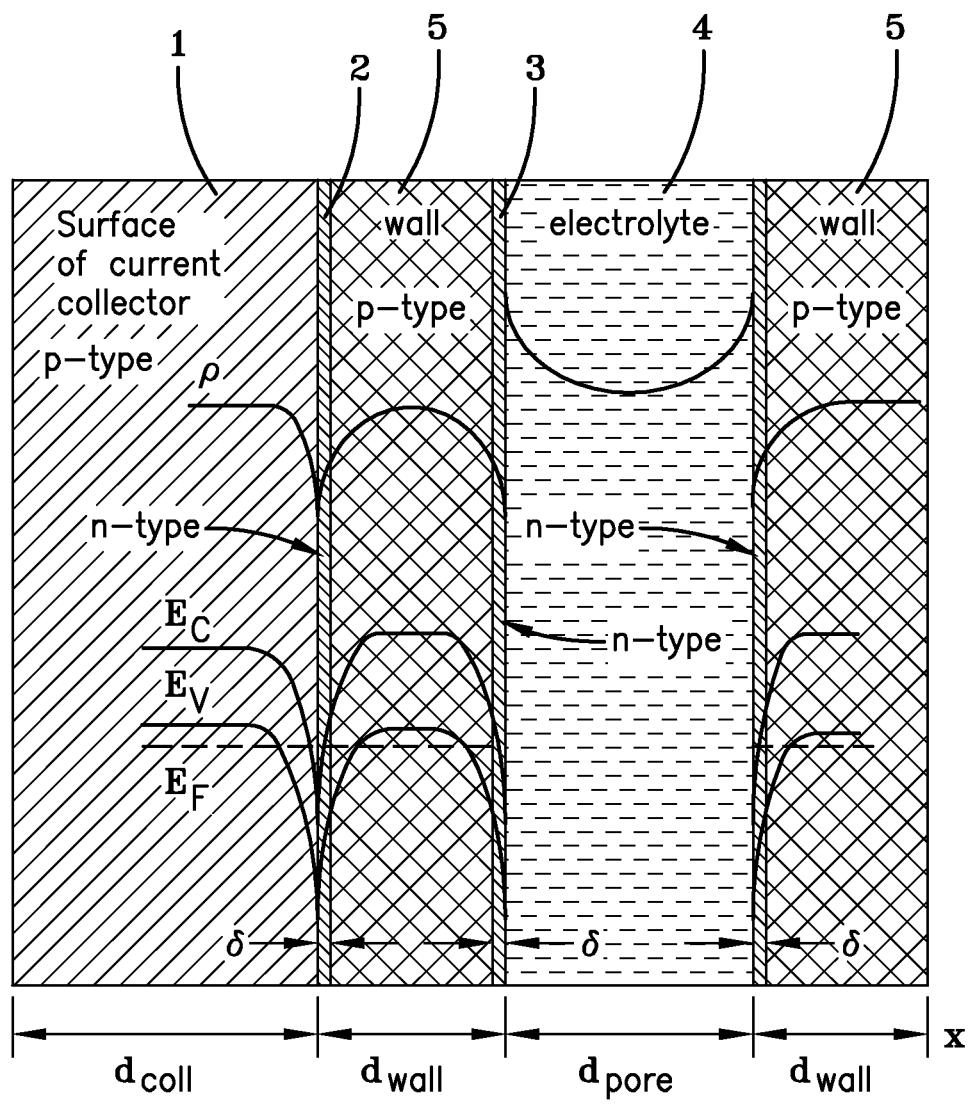
FIG. 1 illustrates a change in conductivity in the surface layer of the electrode of an electrochemical capacitor from the side of its active mass during high polarization of the electrode.
Figure 2:
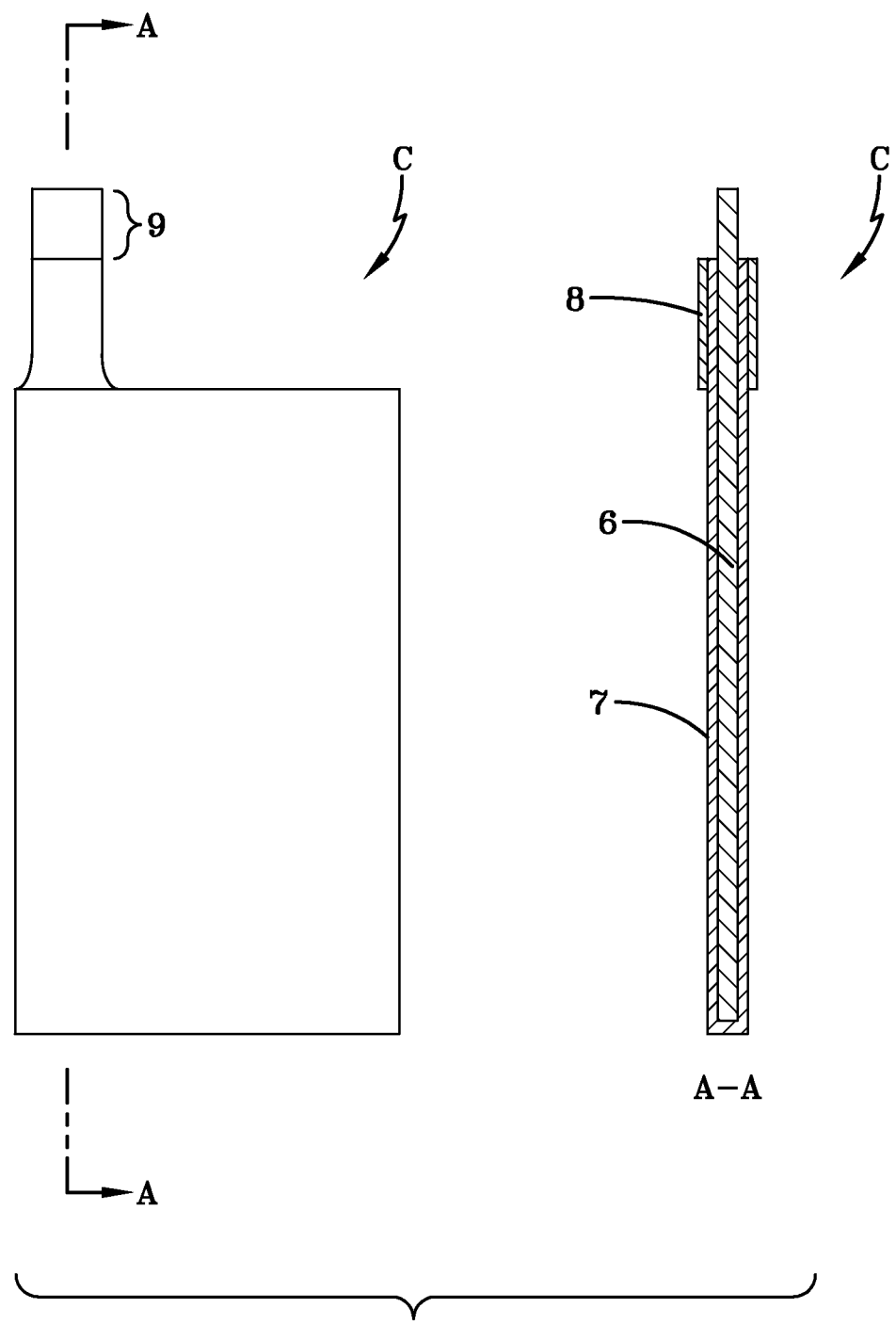
FIG. 2 depicts one exemplary embodiment of a current collector of the present invention.

One exemplary current collector C of the present invention is shown in FIG. 2. The current collector C, comprises a graphite foil 6, on whose working surfaces a conducting protective film 7 is applied. In order to protect a section 8 of a lug of the current collector C, an electric insulating film made of polymer materials that are stable in a particular electrolyte(s) is applied on the surface of the lug—except for the area 9 where the lug connects to the terminal of the capacitor. The conducting protective film 7 has p-type conductivity, low specific electronic resistance, and high ionic resistance.

The manufacture of this exemplary protective film is such that the conducting protective film is a graphite foil containing a minimum quantity of pores and fractures, with a considerable portion of the pores of the graphite foil filled with a composite conducting material. The protective film has a high ionic resistance, which prevents the transfer of non-equilibrium electrolyte ions to the volume of the current collector during charging and discharge of the capacitor, and protects the current collector from loosening and mechanical breakup.

The filling of the pores of the graphite foil with a conducting polymer material also significantly reduces the developed surface of the graphite foil. Furthermore, penetration of a conducting polymer material into the contact area between the particles of the graphite foil does not deteriorate the electric parameters of the graphite foil—in distinct contrast to the protective coating of the previously mentioned known steel current collector.

Should multiple micro pores and/or fractures actually be present or be formed in a graphite foil-based protective film of the present invention, electrolyte may still gradually penetrate through such pores and/or fractures to the interior of the current connector. However, because the protective film has a high ionic resistance that limits the ionic current in the current collector during charging and discharge of the capacitor, the presence of electrolyte in the protective film will not bring about a change in the mechanical parameters of the current collector. This indicates that the charge-discharge process of the capacitor will not cause EDL formation in the current collector—even with electrolyte present in the pores of the graphite foil.

At least the following factors should be taken into account when manufacturing a composite protective film of the present invention: (1) conductivity; (2) contact resistance between the active mass of an electrode and its current collector; and (3) contact resistance between the particles of the graphite foil. Therefore, carbon powders having p-type conductivity are preferably used to manufacture a protective film paste according to the present invention. This results in a protective film of p-type conductivity, in cohesion between carbon particles of the graphite foil (which also have p-type conductivity) without any reduction of their contact resistance, and makes it possible to produce current collectors with low resistance and low and stable contact resistance between the current collector and the carbon active mass of the electrode.

As shown in FIG. 2, except for the connecting portion 9, the remainder 8 of the current collector lug is also covered by a protective film. Protection of this section of the current collector C is very important for its stable operation because current density during the charging and discharge of the capacitor has the highest value in this section of the current collector, which can bring about a major change in the mechanical and, subsequently, electric parameters of the current collector. Thus, when the surface of the protected section 8 of the current collector lug is covered with protective film, the reliability and stability of the current collector is improved.

Insofar as the surface current density in the open surface of the current collector lug during charging and discharge of a capacitor has a certain value and may cause (notwithstanding an insignificant value of the current density) a change of the parameters of this section of the current collector during extended capacitor operation, this area of the current collector is preferably provided with extra protection (as can be seen in FIG. 2). The protected area 8 of the current collector lug is preferably additionally protected by an insulating polymer material, which is chemically stable in the electrolyte. The polymer material (i.e., the protective film without the addition of a conducting material) preferably serves as the insulating material. Research shows this to be a highly workable solution, inasmuch as the use of a similar polymer material provides for stable parameters and for maximum adhesion between the protective layers 7 and 8.

Application of an additional insulating layer to the protected section 8 of the current collector lug greatly reduces the values of the surface currents therein during charging and discharge of the associated capacitor. This not only improves the stability of the parameters and the reliability of the current collector, but also significantly increases the cycle life of the current collector and of associated capacitors as a whole.

The surface of the connecting section 9 of the current collector lug is preferably not provided with any protection. However, during application of the protective film 7, the pores of the graphite foil in the area of the connecting section 9 are also filled with the conducting polymer material. This brings about stabilization of the electric parameters of the graphite foil of the connecting section 9. However, the surface resistance of this section, in contrast to the working surface of the current collector, does not decrease. This makes it possible to connect the current collector C to a terminal of the capacitor with low contact resistance between the current collector and the terminal, and to ensure a low value of resistance and high power output of the capacitor.

Figure 3:
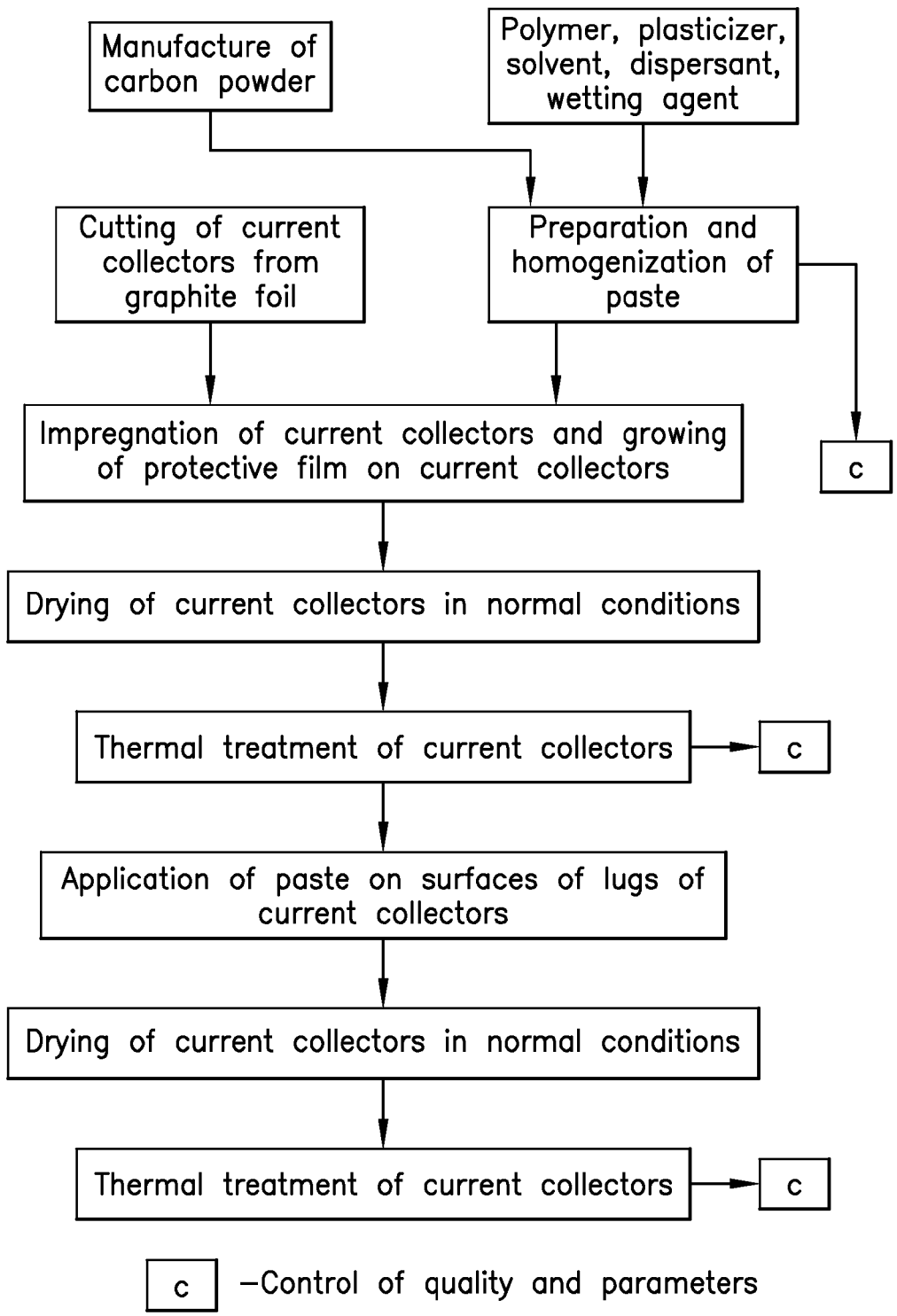
FIG. 3 describes the basic technology involved in the manufacturing of an exemplary graphite foil current collector with protective film according to the present invention.

One method of manufacturing an exemplary current collector of the present invention is illustrated in the flow chart of FIG. 3. A conductive paste is prepared as an initial step in the preparation of the conductive composite protective film that will protect the graphite foil current collector. Basic properties of the paste such as viscosity, electric resistance, and dispersability of the conducting component are very important to the ability of the resulting protective film to subsequently provide adequate protection of the current collector and are, therefore, thoroughly controlled during paste preparation. The composition of this particular paste includes: (1) industrial carbon powder; (2) polymer material; (3) plasticizer; (4) solvent; (5) dispersant; and (6) wetting agent. The amount of each component present in the paste is closely related to the technology of application and to the desired electrophysical parameters of the protective film. As such, the amount of each component may vary subject to the specific requirements of the desired current collector. The optimal component content of a paste to be used for protection of current collectors of capacitors designed for a particular application is generally determined experimentally.

Parameters such as dimensions and conductivity type of the carbon particles are also important in obtaining a quality protective film. Preferably, a carbon powder having high p-type conductivity is selected as the carbon powder for use in the paste. In this example, a Dyno Mill type Multi Lab installation is used to grind the carbon particles of the mixture or the carbon powder and solvent. During grinding, samples of the powder are preferably taken and examined so that the average size of its particles can be controlled. As soon as the maximum size of the carbon powder particles is reduced to about 500 nm, the grinding process is preferably terminated. Experimentation indicates that the grinding time may be in the range of approximately 45-50 minutes, although shorter or longer grinding times may be required based on the material and/or grinding device used.

Reducing the size the carbon powder particles to such an extent helps to produce a continuous elastic protective film with a minimum number of micro pores. That is, as the conducting paste should effectively fill the pores of the graphite foil collector basis during subsequent application thereto, the presence of small carbon particles facilitates filling of the pores with paste containing adequate amounts of carbon powder. Without sufficient amounts of carbon powder in the paste filling the pores of the graphite foil, an increase in the specific resistance of the current collector increases. Additionally, the use of larger carbon particles can result in the carbon powder content of the paste being increased in order to allow the resulting protective film to adequately protect the current collector—and the parameters of the paste therefore change.

After adequate grinding of the carbon powder, the carbon powder, polymer, plasticizer, solvent, dispersant and wetting agent of this particular paste are homogenized. In this particular example, the components were homogenized for approximately 20-30 minutes in a Megatron MT-5000 homogenizer. Other homogenization times and equipment may, of course, also be employed. The resulting paste is preferably filtered through a filter in order to separate large coagulated particles of the carbon powder. Preferably, the filter has a pore diameter of not more than about 1 µm.

Upon completion of the paste, a thin layer thereof is applied to a flat glass substrate, which makes it possible to obtain a reference film of about 10-50 µm in thickness. The resulting film is subjected to thermal treatment and, thereafter, the specific electric resistance and type of conductivity of the film are preferably measured.

Figure 4:
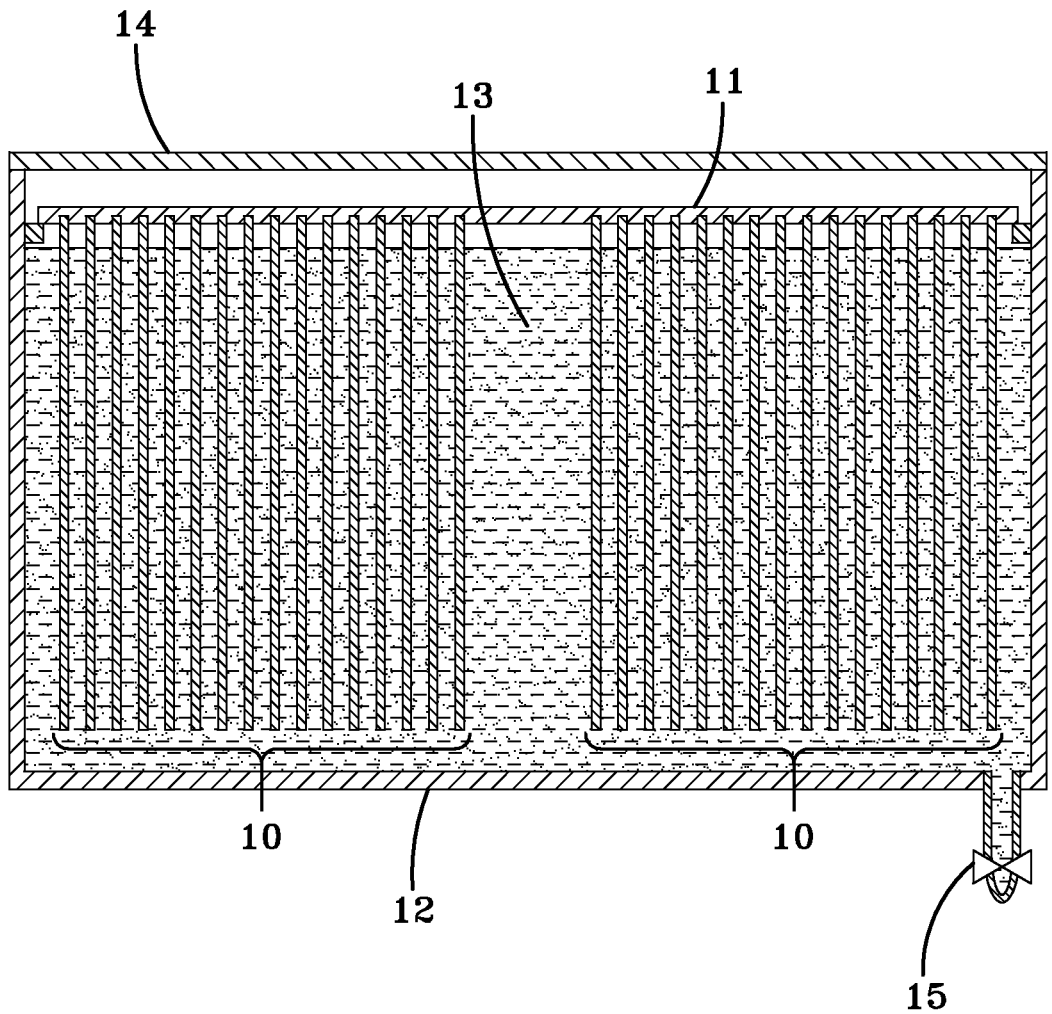
FIG. 4 illustrates the growing of a protective film on a graphite foil current collector.

The desired number of current collector bases of required size and configuration are cut from a graphite foil material at some point before, during or after, manufacture of the protective film. As shown in FIG. 4, a lug section of the current collectors 10 are subsequently fixed in a special holder 11. The current collectors 10 should be held as flat as possible in order to subsequently produce an even protective film along the entire surfaces thereof.

Assuming that the measured parameters of the reference film are acceptable, a bath 12 is filled with the prepared paste 14 to some predetermined level, and the current collectors 10 in the holder 11 are slowly plunged into the paste to grow the protective film. The holder 11 is submerged in the bath 12 until it reaches some predefined and fixed position. Thereafter, the bath is preferably closed with a leak proof cover 14, which is employed to prevent evaporation of the solvent and a change in the parameters of the paste during the process of growing the protective film.

After submersion and sealing, the current collectors are exposed to the paste at room temperature for some predetermined time period. In this particular example, the current collectors are exposed to the paste for between about 15-24 hours. The actual time of exposure will depend on several factors, including the composition of the paste, the viscosity of the paste, and the physical properties of the graphite foil. During exposure of the current collectors to the paste, the pores of the graphite foil become filled therewith. This enhances the mechanical properties of the current collectors and increases the adhesive properties of the current collector surfaces.

Because the surface of a graphite foil may be poorly wetted by a paste, a wetting agent may be added to the paste to improve wettability. The wetting agent makes it possible to obtain a homogeneous paste and increases subsequent adhesion between the graphite foil and the protective film. However, it should be realized that a significant increase in the adhesive properties of the foil can also occur specifically as a result of penetration of the paste into the pores of the foil.

Following appropriate exposure of the current collectors to the paste, a valve 15 is opened and pumping of the paste from the bath is carried out. The pumping of the paste is preferably effected in a manner to ensure that the level of the paste is lowered evenly within the bath. During slow lowering of the paste level, a composite film grows evenly along the entirety of the contacted surfaces of the current collectors. The thickness and micro porosity of the film depends on the rate of removal of the paste from the bath. As experimentation has shown, protective films based on pastes of various composition exhibit minimum porosity and high adhesion to graphite foil when lowering of paste level in the bath is carried out at a rate of between about 0.5-1.5 cm/min.

Once growth of the protective film is complete, the cover of the bath is opened and the holder 11 and current collectors 10 are removed from the bath. The current collectors 10 are subsequently exposed to the air for some period of time (e.g., 10-15 hours in this particular example) in order to allow for drying under ambient conditions. During this time, the bulk of the solvent present in the protective film and volume of the current collectors slowly evaporates. Research has shown that the rate of solvent removal affects the resulting structure of the protective film and, that a fast removal of the solvent (e.g., at increased air temperatures) increases the micro porosity of the protective film and brings about a deterioration of the parameters of the current collectors. As such, the initial exposure of the current collectors and protective film to the air may be controlled.

Subsequent to drying of the current collectors by exposure to the air, the current collectors and their protective films are subjected to thermal treatment. For example, thermal treatment may take place in the ambient air but at increased temperatures. The temperature and time of the thermal treatment depend on the composition of the protective film. A thermal treatment temperature of between about 120° C.-140° C. has proven adequate when polymer materials such as perchlorovinyl (PVC), chlorosulphated polyethylene (Hypalon®), and polyurethane (PU) are present in the paste. However, the thermal treatment temperature may increase to approximately 270° C. when polymers containing fluorine (fluoroplastics) are used. As with temperature, thermal treatment times may vary. With a paste as described in this particular example, the current collectors may be thermally treated for between about 60-90 minutes. Once the thermal treatment process is completed, the electric parameters and the quality of the protective film of the current collectors are controlled by a special method.

At the next stage in the manufacture of the exemplary current collectors 10, a coating of insulating paste is applied to a portion of the current collector lugs (as described above with respect to FIG. 2). The insulating paste may be prepared in a similar manner to the paste used to grow the conducting protective film—but without the use of carbon powder. The insulating film may be applied to the surface of the current collector lugs with a brush, by means of a spray applicator, or by a number of other methods that would be known to one skilled in the art.

After the application of the insulating paste to the current collector lugs, at least that portion thereof is exposed in the air at room temperature for some period of time. In this particular example, the insulting paste is dried for a period of between about 1-2 hours, although drying time may vary as described above. After air drying, at least the lug portions of the current collectors are again thermally treated. Preferably, but not necessarily, the thermal treatment temperature used on the lugs of the current collectors corresponds to the thermal treatment temperature of the protective film. Thermal treatment time may once again vary, however, thermal treatment time in this particular example was between 35-40 minutes.

Once thermal treatment of the current collector lug insulating layer is complete, an inspection of the current collectors is preferably performed. The quality of the obtained protective film is examined, the specific surface resistance of the current collectors is preferably measured, and culling of the current collectors is preferably performed so that only current collectors with satisfactory parameters are forwarded for assembly into electrochemical capacitors.

SPECIFIC EXAMPLES

Example 1

Current collector bases were cut from graphite foil having a thickness of approximately 230 μm. The overall dimensions of the current collector bases was 135 mm×72 mm×0.26 mm, as is shown in FIG. 2. The graphite foil had a specific electric resistance of $6.10^{-4}$ Ohm·cm and p-type conductivity. The mass density of the graphite foil was 1.27 g/cm$^3$.

A protective film paste for coating the graphite foil current collector bases was manufactured using industrial carbon powder (P267E), polymer-perchlorovinyl (PVC), plasticizer (dibutyl sebacate), solvent (acetone, 11-butyl acetate and toluene), dispersant (Texaphor P61), and wetting agent (surfactant). The ratio of ingredients was 5 parts carbon powder, 15 parts PVC, 1.55 parts plasticizer, 78 parts solvent, 0.3 parts dispersant and 0.15 parts wetting agent. Following preparation and filtration, the PVC paste had a viscosity of about 775 cP (according to a Brookfield RVDV-III viscosimeter). Examination of the mass content of the filtered paste showed that the mass ratio of the carbon, polymer and plasticizer components of the conducting composite material was 28:65:7, respectively.

From the conducting paste, a reference film having a thicknesses of approximately 40 μm was produced on a smooth dielectric substrate to allow for measurement of the specific electric resistance and conductivity type of the film. These measurements revealed a specific electric resistance of approximately 2.15 Ohm·cm and a p-type conductivity.

Growing of a conducting protective film on the surface of the current collector bases was effected as described above. The time of exposure of the current collectors to the paste was 24 hours, and the rate of the film growth (i.e., paste level reduction) was 0.5 cm/min. Upon completion of protective film growth, the current collectors were exposed to the air at room temperature for 12 hours. Thereafter, thermal treatment of the current collectors was performed in the ambient air at a temperature of about 110° C. for 80 minutes. The thickness of the protective film was about 15 μm.

An insulating paste with a composition of polymer (PVC), plasticizer (dibutyl sebacate), solvent (acetone, n-butyl acetate, toluene), dispersant (Texaphor P61), and wetting agent (surfactant) was prepared to provide for the additional protection of sections of the current collector lugs. The mass ratio of components was 14.55:5:80:0.3:0.15, respectively.

Following preparation and filtration, the paste had a viscosity of about 125 cP (according to a Brookfield R VDV-III viscosimeter). Additional protection of the current collector lug sections was effected by application thereto of the insulating paste with a brush. Following application of the insulating paste, the current collectors were exposed to the air at room temperature for 2 hours and, thereafter, were subjected to thermal treatment (air dried) for 30 minutes at a temperature of about 110° C.

Following manufacture of the current collectors, measurements were taken to determine the specific surface resistance in different sections of sides "a" ($\rho a$) and "b" ($\rho b$) of the current collectors, and the type of their conductivity was also identified. It was thus determined that the average value of the protective film thickness was 15 μm. The variation in the thickness of the protective film over the working surface of the current collectors did not exceed 20%.

The value of the specific electric resistance along the surface of the current collector did not change, and its average value was $\rho a = \rho b = 0.15$ Ohm cm². In any event, inasmuch as the resistance of the junction of the protective film and graphite foil is the primary factor determining the specific electric resistance of the current collector, any change in the thickness of the protective film along the surface of the current collector would not practically affect the value of its specific electric resistance. As determined by a thermal probe method, the protective films were of p-type conductivity.

The thickness of the insulating layers on the current collector lugs was also measured. The thicknesses of the insulating layers of different current collectors varied from about 25 μm to about 40 μm. The variation in the thicknesses of the insulating layers is due, no doubt, to the manual method of application employed. Such variation could be easily eliminated if desired by automating the process of applying the insulating material.

Figure 5:
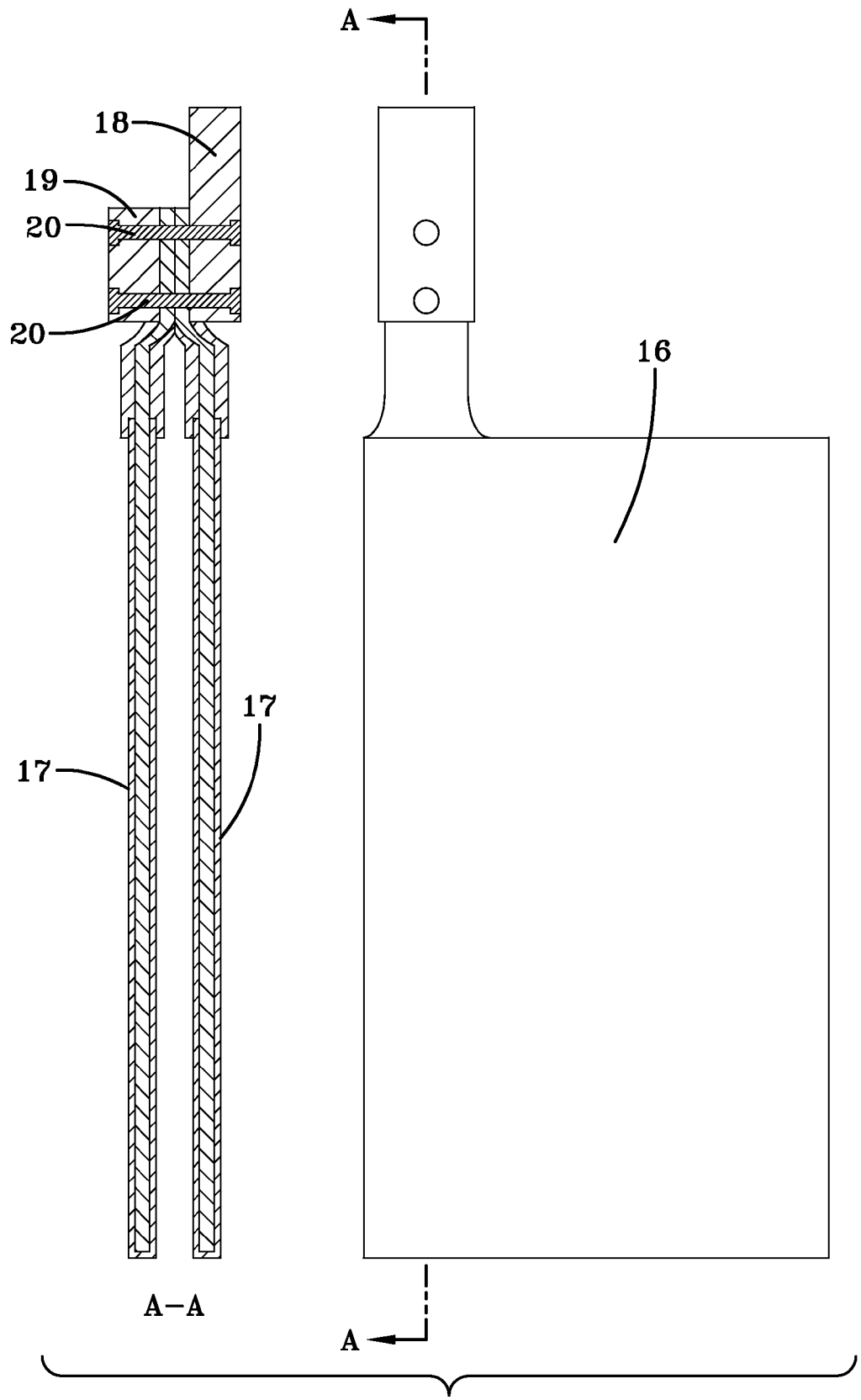
FIG. 5 shows an exemplary method of connecting a graphite foil current collector to a terminal of an electrochemical capacitor negative electrode.

As shown in FIG. 5, electrochemical capacitors were subsequently assembled by connecting the lugs of two current collectors 16 with the terminal of the capacitor's negative electrode. The connecting portion of the current collector lugs, which are not covered by the protective film 17, were put between two flat highly conductive and specially manufactured parallelepipedic graphite plates 18, 19. The plates were subsequently compressed. The pressure exerted on the graphite plates 18, 19 was about 2.5 kg/cm². Following compression of the plates, a molten lead-antimony alloy ($PbSb_7$) was poured into specially provided openings in the graphite plates 18, 19 and the current collector lugs to allow for the subsequent introduction (after cooling of the lead-antimony alloy) of rods 20. The rods 20 formed in the openings provide for reliable electric contact between both the current collectors themselves and between the current collectors and the graphite plate 18 that is used as an outlet terminal of the capacitor's negative pole. The graphite plates also facilitate a low and stable contact resistance between the current collectors and the outlet terminal 18 during extended operation of the capacitor.

After cooling, there occurs a shrinkage of the rods 20 that causes an increase in the compression exerted by the plates 18, 19 on the current collector lugs—and an even greater decrease of the contact resistance. Additionally, the lead-antimony alloy has a much lower electric resistance than does the graphite of the plates and, therefore, further lowers the contact resistance associated with the connection of the current collectors 16. Because the lead-antimony alloy is stable in aqueous sulfuric acid electrolyte, it also provides for a stable connection of the current collectors 16 and the terminal of the capacitor during the entire service life of the capacitor.

Figure 6:
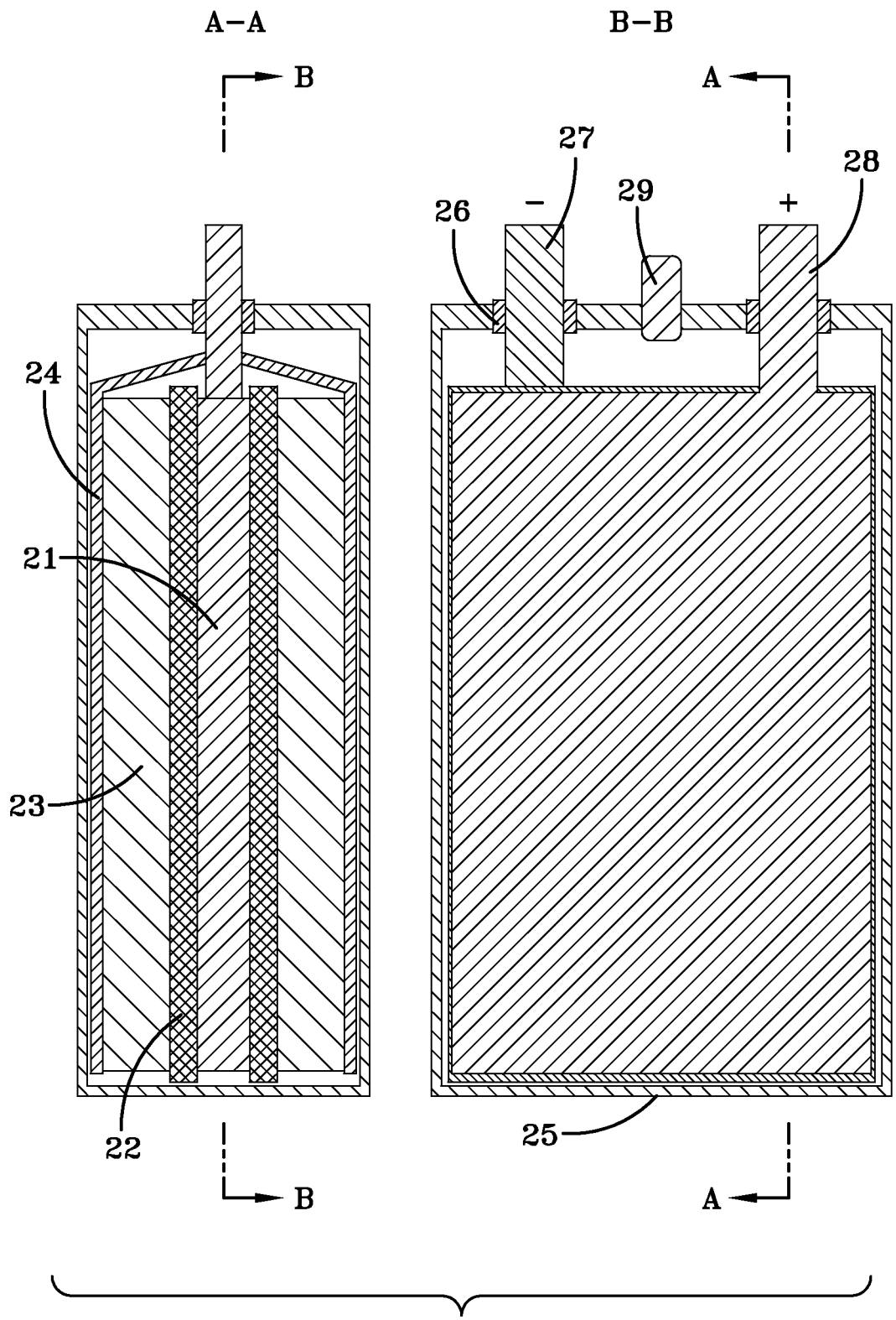
FIG. 6 is a cross-sectional view of an exemplary heterogeneous electrochemical supercapacitor (HES) with electric double layer.

For the purpose of testing and checking the parameters of this exemplary current collector of the present invention as part of an electrochemical capacitor, a heterogeneous electrochemical supercapacitor (HES) with an electric double layer (EDL) was assembled. As shown in FIG. 6., HES#1 consists of a positive (non-polarizable) electrode 21 based on lead oxide, two negative (polarizable) electrodes having an active mass 23 based on an activated carbon material, two negative electrode graphite current collectors 24 of the present invention, and two porous separators 22. The electrodes and the separators were impregnated by a rated amount of aqueous sulfuric acid electrolyte with a density of 1.26 g/cm³. The electrode assembly was placed in a case 25 with a seal 26 around each of the negative and positive electrode current leads 27, 28. The capacitor HES#1 was equipped with an emergency relief valve 29.

The positive electrode of the capacitor HES#1 had a Coulomb capacity of about 6 A·h and overall dimensions of approximately 135 mm×72 mm×1.5 mm. The separators were AGM-separators of RECOMAT 15064XXP type (from BERNARD DUMAS, France), and had a thickness of approximately 0.4 mm.

Two carbon plates of PAC-MM-221 type carbon powder (from Material Methods LLC, U.S.) having overall dimensions of approximately 135 mm×72 mm×2.0 mm and an aggregate mass of 21.6 g were used in the negative (polarizable) electrodes of the capacitor HES#1. The specific (by mass) electric capacity, mass density and specific electric resistance of PAC-MM-221 carbon plates were 620 F/g, 0.56 g/cm³, and 2.2 Ohm·cm, respectively. The carbon plates were of p-type conductivity.

A second HES capacitor (HES#2) was also manufactured. The second capacitor HES#2 had a negative electrode with a graphite foil current collector, and was manufactured in a similar manner to the first capacitor HES#1. However, unlike the first capacitor HES#1, the negative electrode current collectors of the second capacitor HES#2 did not have a protective film. The design of the positive and negative electrodes, as well as the design of the first capacitor HES#1 and the second capacitor HES#2 as a whole, were made to be identical so as to allow a proper comparison of their parameters.

The first and second capacitors HES#1, HES#2 were subjected to charge-discharge cycles as follows: the capacitors HES#1, HES#2 were charged at a constant current of 0.55 A until the voltage of their cells reached 2.4V; a pause of approximately 5 minutes was provided; the capacitors HES#1, HES#2 were then discharged at constant current 0.55 A until the voltage of their cells reached about 0.8V volts; and thereafter a pause of approximately 5 minutes was provided.

The cycle tests were performed in a continuous mode at room temperature. During certain cycles, measurements were taken to identify impedance |Z| dependence (at 50 Hz frequency) on the voltage of the first and second capacitors HES#1, HES#2 during their charge and discharge. In the course of testing, the following parameters of the capacitors HES#1, HES#2 were measured: (a) Coulomb capacity during charge ($Q_{CH}$) and during charge ($Q_D$); (b) energy during charge ($E_{CH}$) and during discharge ($E_D$); (c) voltage; and (d) Ohmic resistance at the beginning of discharge ($R_{BD}$) and at the end of discharge ($R_{ED}$).

At the beginning of the tests, five charge-discharge cycles were performed on each capacitor to stabilize and identify their parameters. After the five preliminary charge-discharge cycles, the first and second capacitors HES#1, HES#2 each had an electric capacitance of 7.2 kF. The Coulomb capacity of the capacitors was 2.34 A·h. The Ohmic resistance of the first capacitor HES#1 at the beginning and end of discharge was $R_{BD}$=60.15 mOhm and $R_{ED}$=44.75 mOhm, respectively. The Ohmic resistance of the second capacitor HES#2 at the beginning and end of discharge was $R_{BD}$=54.55 mOhm and $R_{ED}$=34.93 mOhm, respectively.

The cycle tests showed that the delivered energy ($E_D$) during discharge of the first capacitor HES#1 during the initial cycles was 11.67 kJ, and the delivered energy ($E_D$) during discharge of the second capacitor HES#2 was 12.77 kJ. It can be seen in FIG. 7 that at the initial phase of testing of the first capacitor HES#1, its delivered energy ($E_D$) value was slowly growing and remained rather stable up to the $52^{nd}$ cycle. At the $52^{nd}$ cycle, the delivered energy of the first capacitor HES#1 was 12.12 kJ.

Figure 7:
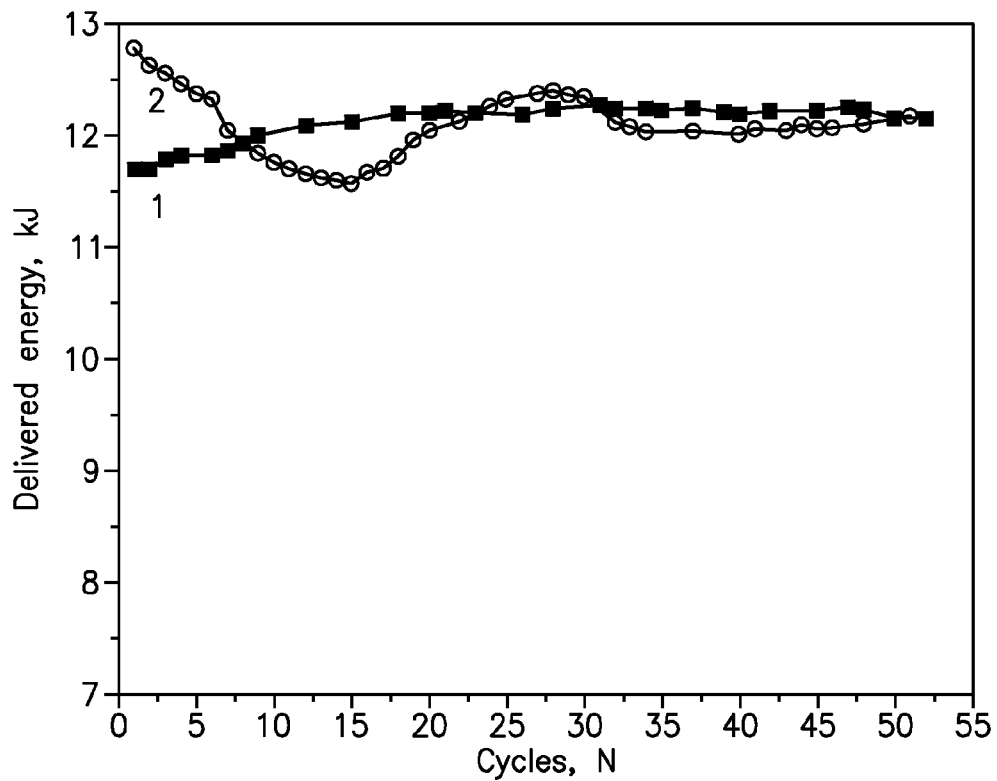
FIG. 7 graphically illustrates the dependence of discharge energy of two different HES' on the number (N) of their charge-discharge cycles.

During cycle testing of the second capacitor HES#2, the value of the delivered energy ($E_D$) was monotonously decreasing up to the $15^{th}$ cycle and, thereafter, there occurred a slow growth of the delivered energy up to the $30^{th}$ cycle (see FIG. 7). Subsequent testing of the second capacitor HES#2 shows that after the $35^{th}$ cycle, there occurs a slight growth of the delivered energy and at the $52^{nd}$ cycle the delivered energy reached a value of 12.15 kJ.

Figure 8:
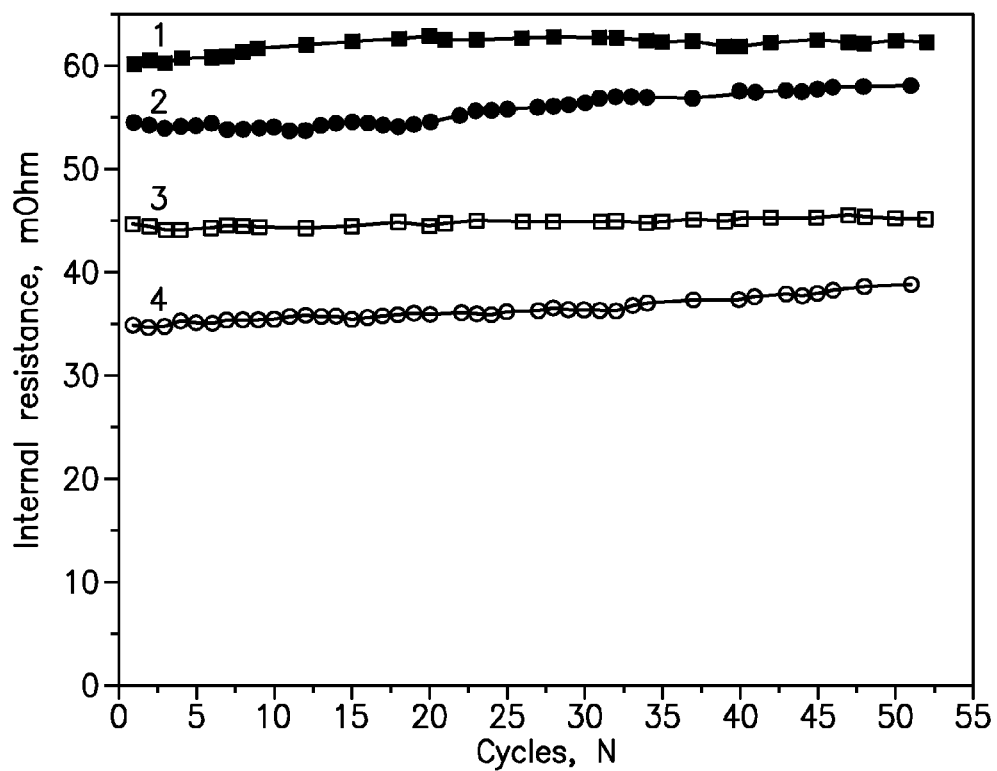
FIG. 8 graphically depicts the dependence of the internal resistances of the HES' represented in FIG. 7 at the beginning and at the end of discharge on the number (N) of their charge-discharge cycles.

The stability of the internal resistance exhibited by the first capacitor HES#1 during cycle testing is indicative of the stability of the parameters of the negative electrode current collector. As the internal resistance of a HES capacitor depends on the state of its charge, the most important characteristic in the above-described mode of testing is the internal resistance of the capacitor at the beginning of discharge ($R_{BD}$). One can see from FIG. 8 that at the beginning of testing of the first capacitor HES#1, its resistance ($R_{BD}$) slowly grew from 60.15 mOhm to 62.7 mOhm and, thereafter, remained unchanged during the remainder of testing. This slight increase of resistance ($R_{BD}$) is related to a change in the electric parameters of the carbon plates and the ambient temperature during testing. The value of the first capacitor's HES#1 internal resistance at the end of discharge ($R_{ED}$) did not change during the test, which is evidence of the high stability of the electric and electrochemical parameters of its negative electrode current collector.

The resistance at the beginning of discharge ($R_{BD}$) of the second capacitor HES#2 at the initial phase of the testing is also rather stable. However, after the 20th cycle there occurs a slow monotonous growth of resistance until testing is completed (see FIG. 8). The resistance at the end of discharge ($R_{ED}$) of the second capacitor HES#2 is also monotonously growing from the beginning of the test, and its growth continues until the testing is completed. At the 52nd cycle, the value of the resistance at the end of discharge ($R_{ED}$) of the second capacitor HES#2 reaches 38.62 mOhm (i.e., the rate of the growth of the resistance at the end of discharge (($R_{ED}$) is 0.071 mOhm/cycle).

Therefore, the changes in the internal resistances of the first and second capacitors HES#1, HES#2 during their cycle tests shows that the graphite foil current collector with protective film of the first capacitor offers more stable operating parameters when used in a HES capacitor. This result is also supported by the impedance |Z| dependence of the first and second capacitors HES#1, HES#2 on voltage during their charge and discharge over different cycles.

Figure 9A:
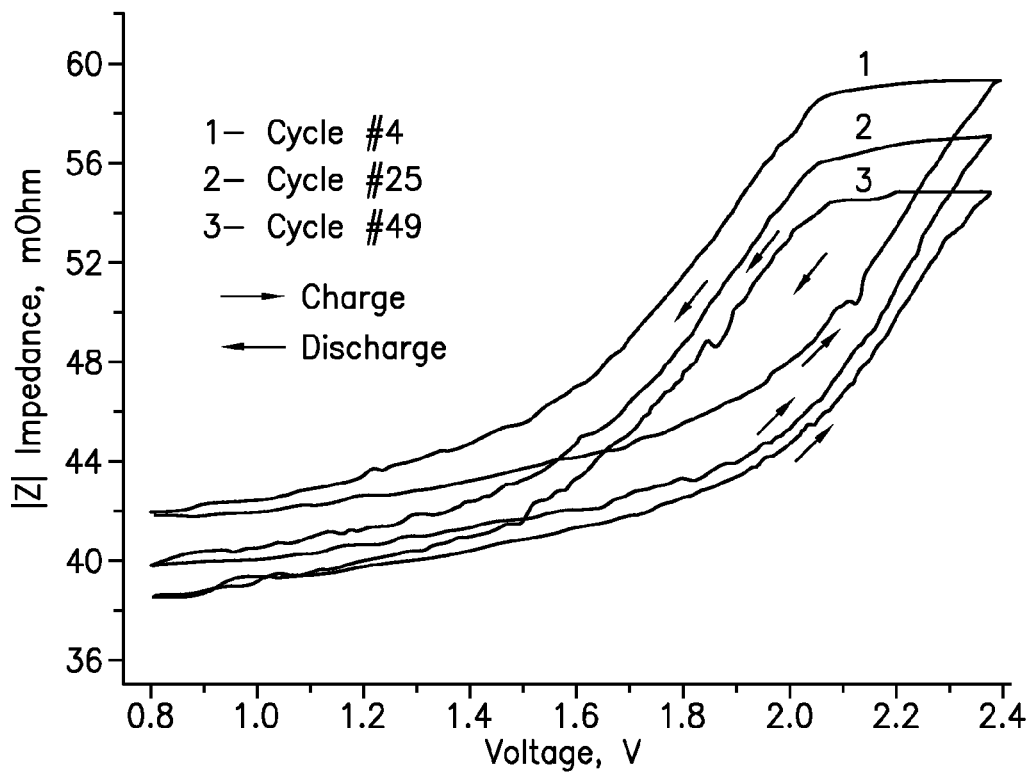
FIG. 9a graphically illustrates the dependence of impedance |Z| of the first HES on voltage during a 5 hour charge and 5 hour discharge cycle.

As can be observed in FIG. 9a, the value of impedance |Z| of the first capacitor HES#1 at the beginning and at the end of discharge monotonously decreases as the number of its charge-discharge cycles increases. This is consistent with the measurements of Ohmic resistances of the first capacitor HES#1 obtained during its testing. That is, a slight decrease in the impedance of the first capacitor HES#1 as the number of cycles increases is caused primarily by a change of the parameters of the carbon electrodes used, and demonstrates the stability of the parameters of its negative electrode current collectors.

Figure 9B:
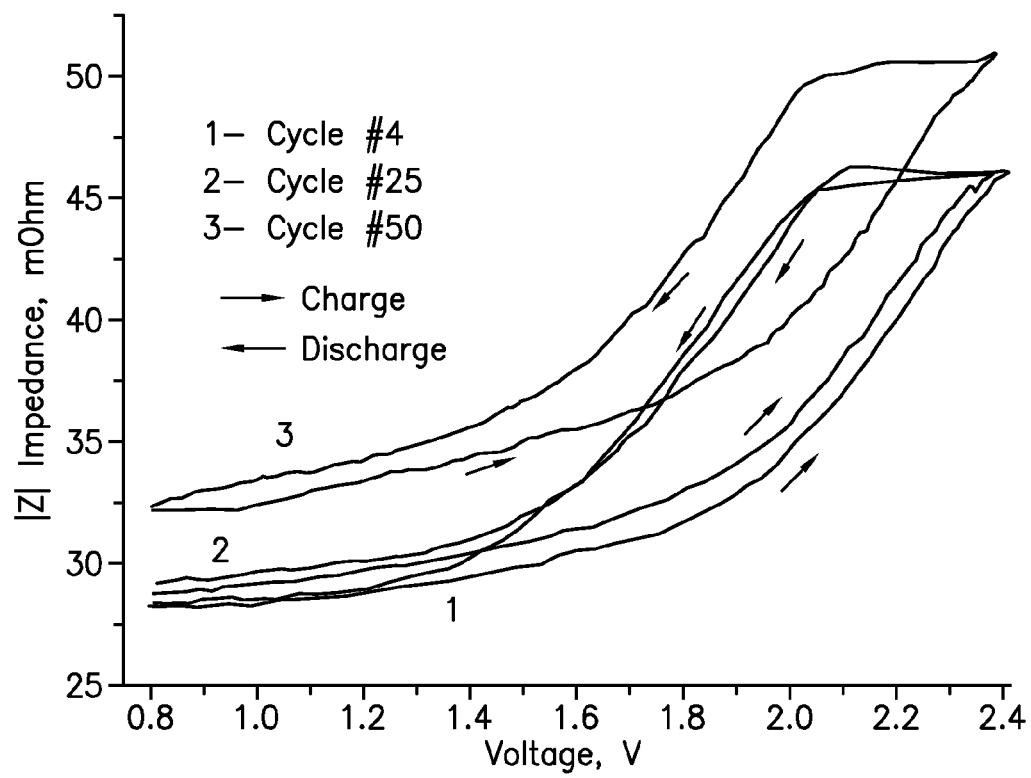
FIG. 9b graphically illustrates the dependence of impedance |Z| of the second HES on voltage during a 5 hour charge and 5 hour discharge cycle.

The impedance of the second capacitor HES#2 at the end of discharge also slowly grew as the number of charge-discharge cycles of the capacitor increased (see FIG. 9b). The same is true of its Ohmic resistance at the end of discharge (see FIG. 8, curve 4). This indicates that the graphite foil current collector without a protective film has unstable parameters (and is insufficient to ensure stable energy and capacity parameters of a HES capacitor).

After the completion of 52 charge-discharge cycles, the first and second capacitors HES#1, HES#2 were charged and disconnected from their power source, and were subsequently stored at room temperature in order to measure any losses of energy and electric charge during their storage. During storage, the voltages of the capacitors were continuously measured. The time of storage was 70 hours.

After completion of the self-discharge measurements of the first and second capacitors HES#1, HES#2, their discharge was performed at a constant current of 0.55 A and, when their voltages reached 0.8V volts, the energy and capacity parameters of the capacitors were measured. Table 1 shows the energy and capacity parameters of the first and second capacitors HES#1, HES#2 both before and after their storage.

Figure 10:
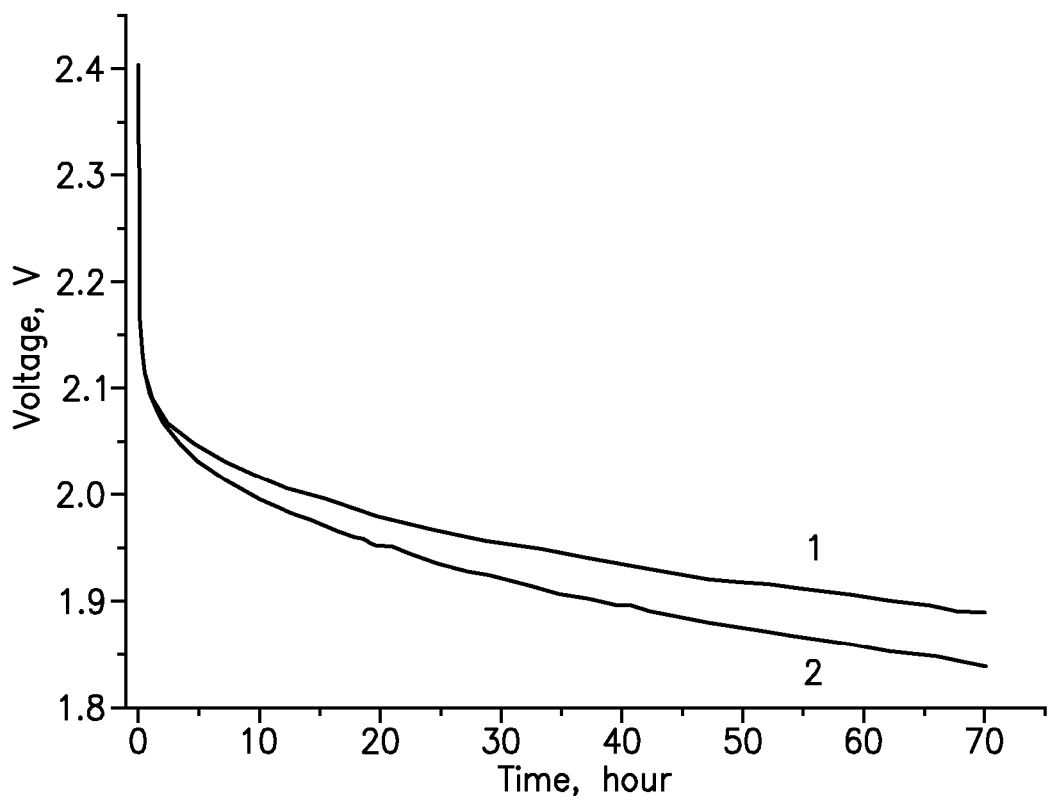
FIG. 10 graphically depicts the dependence of the voltages of the two HES' on the time of their storage at room temperature.

The dependence of the voltage of the first and second capacitors HES#1, HES#2 on the time of their storage can be observed in FIG. 10. As can be seen, the voltage of the second capacitor HES#2 decreases faster than the voltage of the first capacitor HES#1. FIG. 10 shows that the losses of energy and electric charge of the first capacitor HES#1 (having graphite current collectors covered with a conductive protective film based on PVC polymer), are considerably less than those of the second capacitor HES#2 (having unprotected graphite current collectors).

The discharge of the first and second capacitors HES#1, HES#2 after their storage at room temperature for 70 hours showed that the residual Coulomb capacity ($Q_{res}$) and energy ($E_{res}$) of the first capacitor HES#1 were 2.0 A·h and 9.43 kJ, respectively (see Table 1). The losses of energy ($\delta_E$) and electric charge ($\delta_Q$) of the first capacitor HES#1 were 2.77 kJ and 0.34 A·h, respectively. Therefore, the relative losses of energy and electric charge of the first capacitor HES#1 after its storage for 70 hours were 22.7% and 14.5%, respectively. The average rates of loss of energy and electric charge of the first capacitor HES#1 were, thus, 1.83 J/(g·h) and 0.81 C/(g·h), respectively. The average rates of loss of energy and charge of the second capacitor HES#2 were 2.17 J/(g·h) and 1.0 C/(g·h), respectively.

After the completion of the testing of the first and second capacitors HES#1, HES#2, the capacitors were disassembled for research of the electric, physical and mechanical parameters of their respective current collectors. The dismounted current collectors of the capacitors were rinsed several times with deionized water to remove the electrolyte from their surface and pores, and were dried in the ambient air at the temperature of about 80° C. for around 5 hours. The study of the working surfaces and free sides of the current collectors with the use of an optical microscope showed that domelike sections, with dimensions from about 0.5 mm to about 3 mm, were formed in the working surfaces of the current collectors of the second capacitor HES#2. Similar domelike sections also formed on the surfaces of the free side of this current collector, but their density was smaller in comparison to the density of the section on the surface of the working side. It should also be noted that in the areas that are closer to the lugs of the current collector, the density and dimensions of the domelike sections increased on the surfaces of both the working side and the free side of the current collector. Especially significant changes occurred on the surface of the lugs of the second capacitor's HES#2 current collector.

The measurements of the electric parameters of the current collectors of the second capacitor HES#2 showed that after cycle testing the specific resistance on the working sections of the current collectors increased by about 1.25 times. In the areas of the lugs of the current collectors, the specific resistance increased by about 1.45 times. Furthermore, the mass density of the current collectors decreased. The mass density of the working sections of the current collectors changed from 1.27 g/cm$^3$ to 1.16 g/cm$^3$, and in the area of the lugs of the current collectors, to 1.09 g/cm$^3$.

The changes in the physical and mechanical parameters of the graphite foil current collectors without a protective film of the second capacitor HES#2, after short but heavy-duty testing in the capacitor, are attributable to the fact that during the evolution of hydrogen in the volume of the current collector occurred during capacitor operation. The hydrogen gradually expanded and loosened the current collector material, which brought about a deterioration of the mechanical parameters and mass density of the unprotected graphite foil, as well as an increase in its specific electric resistance.

The condition of the current collectors of the first capacitor HES#1 remained unchanged after cycle testing. No defects on the surfaces of the protected graphite foil current collectors or on the surfaces of their lugs was were detected. Measurements of the mass density and specific electric resistance of the protected current collectors of the first capacitor HES#1 showed that these parameters also remained unchanged during/after testing. Therefore, it is clear that the breakup of the current collectors of the first capacitor HES#1 by hydrogen did not take place as it did with the current collectors of the second capacitor HES#2. This difference is due to the effect of the protective film on the current collectors of the first capacitor HES#1.

Measurements were also taken to identify the contact resistance of the lugs of the current collectors and the contact resistance of the current collectors with the terminals of the first and second capacitors HES#1, HES#2. The results showed that the contact resistances between current collectors and between current collectors and terminals of the first capacitor HES#1 did not change as a result of cycle testing. The values of the specific surface resistances of "a" and "b" sides of the current collector of the first capacitor HES#1 also remained unchanged. In contrast, the contact resistances between current collectors and between current collectors and terminals of the second capacitor HES#2 capacitor increased by 15% and 26%, respectively.

The stability of the contact resistances between current collectors and between current collectors and terminals of the first capacitor HES#1 proves that the graphite terminals make it possible to provide for stable contact resistances between the current collectors as well as a stable internal resistance of a capacitor as a whole. Consequently, when manufacturing HES' with a negative electrode current collector of the present invention, highly conducting graphite may be used as a material for the terminal of the negative pole of the capacitor.

Therefore, after testing of the first and second capacitors HES#1, HES#2 in a rather heavy-duty manner, the test results reveal that the capacity and energy parameters of a HES with a protected current collector of the present invention remain stable. The graphite foil current collector having a protective film based on a conductive PVC polymer exhibits stable energy, electrochemical and physical characteristics during operation in a HES with an aqueous sulfuric acid electrolyte. Thus, use of a current collector of the present invention makes it possible to manufacture HES' with advanced parameters.

It is also evident that a current collector of the present invention makes it possible to reduce losses of energy and electric charge of HES'. Consequently, use of current collectors of the present invention will enable HES' to better conserve stored energy. Capacitors utilizing current collectors of the present invention may be successfully operated to store energy for various purposes—and can do so with high efficiency over extended periods of time.

Example 2

In this exemplary construction, chlorosulphated polyethylene (Hypalon®) polymer was used to protect graphite foil current collectors. In comparison to the PVC polymer used in the first capacitor HES#1, Hypalon® polymer has higher elasticity and adhesion to, among other things, carbon materials. Further, the use of this polymer in the manufacture of the protective film eliminates the need for additional components such as plasticizers and surfactants—which reduces the cost of manufacture of a current collector of the present invention.

A protective film paste was manufactured in a manner similar to that described above, and included industrial carbon powder (P267E), chlorosulphated polyethylene (Hypalon®) polymer, solvent (toluene), and dispersant (Texaphor P61). The components were present in a ratio of 2.5:8:89.45: 0.05, respectively. After preparation and filtration, the Hypalon® paste had a viscosity of about 1,580 cP (according to a Brookfield RVDV-III viscosimeter). An examination of the mass composition of films obtained from the filtered paste established that the mass ratio of the components of the conducting composite material was 28 parts industrial carbon and 72 parts polymer.

After preparation of the paste, a reference film (without a substrate) having a thickness of about 12 μm was manufactured. The measurements of the specific electric resistance and conductivity type of the reference film showed that the value of the specific electric resistance of the protective film was 5.1 Ohm·cm and that the film was of p-type conductivity.

Current collector bases were cut from graphite foil and had parameters and overall dimensions similar to those set forth in Example 1. Growing of a protective film on the surface of the current collector bases was also performed in the manner described in Example 1. The time of the exposure of the current collectors to the paste was 24 hours and the rate of the protective film growth (paste level reduction) was 0.32 cm/min. Following the completion of protective film growth, the current collectors were exposed in the air at room temperature for 2 hours and, thereafter, additional protection of sections of the current collector lugs was performed.

The insulating paste for further protecting the lugs of the current collectors was comprised of (by mass) 25% Hypalon® polymer and 75% solvent (toluene). The viscosity of the paste after preparation and filtration was 320 cP (according to a Brookfield RVDV-III viscosimeter). The additional protection of the lug sections was performed by application of the insulating paste with a brush. After application of the insulating paste, the current collectors were exposed in the air at room temperature during 2 hours and, thereafter, subjected to thermal treatment at a temperature of about 130° C. for 70 minutes.

External mechanical pressure on the case of an electrochemical capacitor is the most common traditional technique for providing reliable and sufficient contact between the capacitor's current collectors and carbon electrode plates. Unfortunately, this also results in an increase in the mass of such capacitors, in additional construction costs, and in certain operational inconveniences.

Unlike these known current collectors, a current collector of the present invention having a protective film made with Hypalon® polymer exhibits a good adhesion to carbon plates after its thermal treatment. For example, under even slight pressure (e.g., 0.5 kg/cm²), carbon plates adhere rather reliably to the working surfaces of these invention current collectors. This makes it possible to provide for reliable electric contact at the current collector/carbon plate interface, with low transient resistance along the entire surface of the carbon plates, and without the need to employ external mechanical pressure on the capacitor. Additionally, when manufacturing such capacitors, carbon plates can be pressed (adhered) to both working surfaces of this current collector of the present invention, which results in a complete negative electrode. The use of a complete negative electrode greatly facilitates the process of assembling a capacitor and reduces the cost thereof.

Measurements of the electric parameters of current collectors of the present invention made with a conductive protective film including Hypalon® polymer show that $\rho a$ and $\rho b$ resistances are evenly distributed along the surfaces of the current collectors and that their value is about $\rho a = \rho b = 0.7$ Ohm·cm². The thickness of the protective film of the current collectors and the additional insulating layer of the current collector lugs measured about 10 μm and 15 μm, respectively.

A third exemplary HES (HES#3) was manufactured with the use of such negative electrode current collectors and has a design that is substantially identical to the HES design set forth in Example 1. This third capacitor HES#3 includes two carbon plates of the PAC-MM-221 type material with overall dimensions of approximately 135 mm×72 mm×2.0 mm and an aggregate mass of 22.3 g. To ensure connection of the Hypalon®-containing current collectors of the present invention to the carbon plates, the current collectors and carbon plates were pressed together at a pressure of about 0.4 kg/cm². The specific (by mass) electric capacity, mass density and specific electric resistance of the carbon plates was 622 F/g, 0.57 g/cm³, and 2.56 Ohm·cm, respectively. The carbon plates had p-type conductivity.

The third capacitor HES#3 was subjected to charge-discharge cycle tests as follows: the capacitor was charged for 5 hours at a constant current of 0.55 A; a five minute pause was provided after charging; discharging was accomplished at a constant current of 0.55 A until a voltage of 0.8V was reached; and a 5 minute pause after discharge was provided.

At the beginning of the testing, five preliminary charge-discharge cycles of the capacitor were performed to stabilize and identify its parameters. After the five preliminary charge-discharge cycles, the electric capacity of the third capacitor HES#3 was 7.65 kF. The Coulomb capacity of the third capacitor HES#3 capacitor during discharge to a voltage of 0.8V was 2.56 A·h. The internal resistances $R_{BD}$ and $R_{ED}$ of the third capacitor HES#3 were 88.4 mOhm and 49.2 mOhm, respectively.

Cycle testing of the third capacitor HES#3 showed that the energy delivered thereby during discharge in the initial cycles was 12.9 kJ. The discharge energy of the third capacitor HES#3 remained unchanged during cycle testing (see FIG. 11, curve 1). Furthermore, the dependence of the voltage of the third capacitor HES#3 on the state of its charge (see FIG. 12) also remained unchanged during 52 charge-discharge cycles. A slight increase in the Coulomb capacity of the capacitor was measured, but is related to an increase of the wettability of its carbon plates by the electrolyte during cycling.

Figure 13:
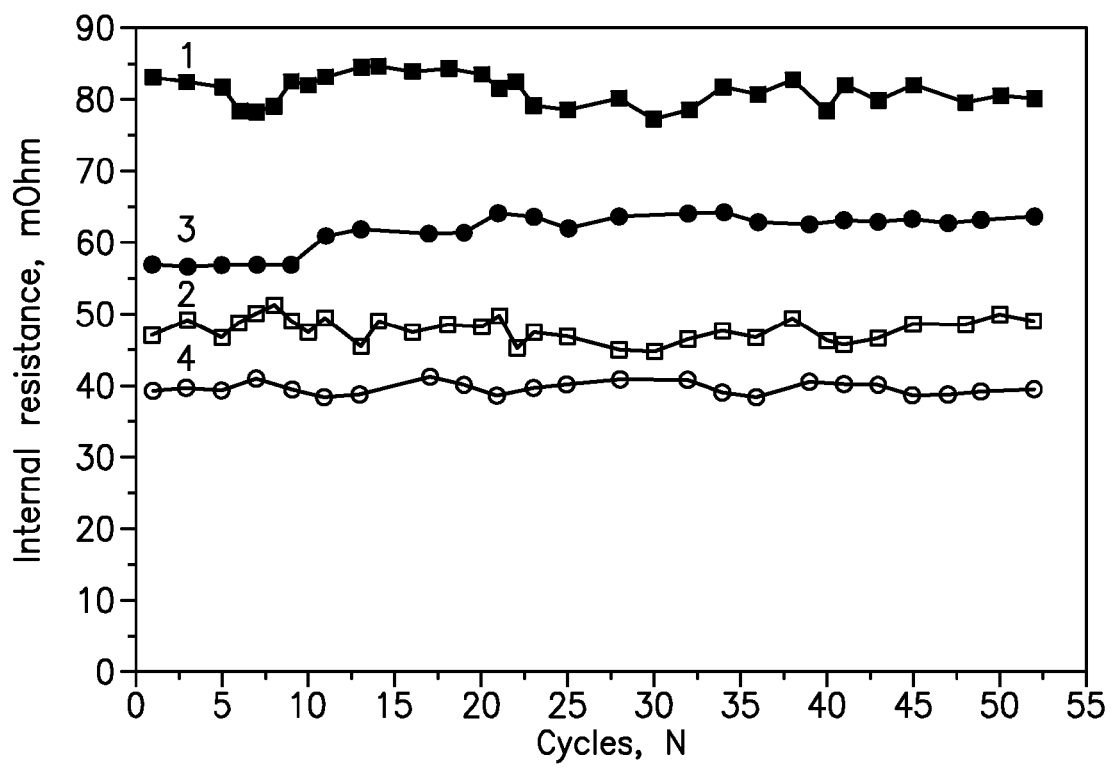
FIG. 13. graphically illustrates the dependence of the internal resistances of the third and fourth HES on the number (N) of their charge-discharge cycles, at the beginning and at the end of discharge.

The value of the internal resistance of the third capacitor HES#3 was unchanged at the end of discharge (see FIG. 13, curve 2). The value of the internal resistance at the beginning of discharge ($R_{BD}$) decreased slowly (FIG. 13, curve 1), and at $52^{nd}$ charge-discharge cycle was 80.2 mOhm. A slight decrease of the resistance at the beginning of discharge was attributable to an increase in the wettability of the carbon plates by the electrolyte during cycle testing, which brought about a decrease in the resistance of the carbon plates and of the capacitor as a whole.

Figure 14A:
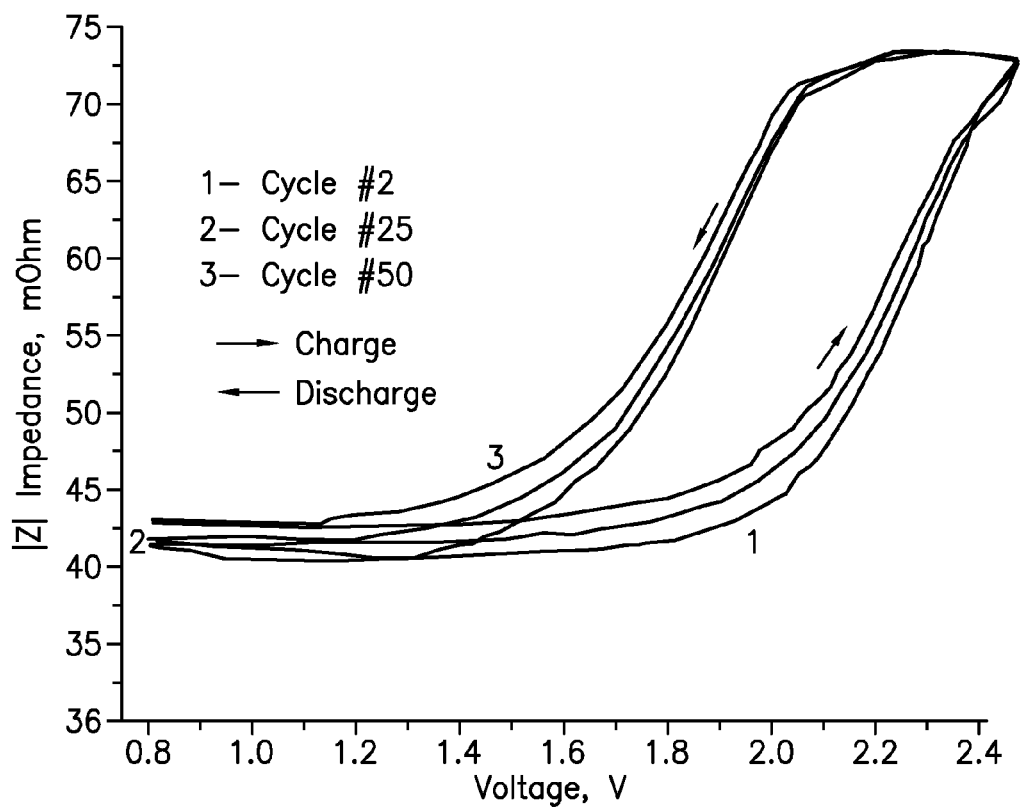
FIG. 14 graphically depicts the dependence of impedance |Z| of the third and fourth HES on voltage during a 5 hour charge and 5 hour discharge cycle.

Measurement of impedance |Z| dependence of the third capacitor HES#3 on voltage during its different charge-discharge cycles (see FIG. 14a) shows that the value of |Z| remained stable over the entire operating range of voltages throughout cycle testing. In light of the high stability of the discharge energy, the Coulomb discharge capacity, the impedance |Z| and the internal resistances $R_{BD}$ and $R_{ED}$ of the third capacitor HES#3, it is obvious that the parameters of this embodiment of the current collectors of the present invention are highly stable. Consequently, their use makes it possible to produce a HES that also exhibits stable energy and capacity parameters.

After the completion of the charge process at the $53^{rd}$ charge-discharge cycle, the charged third capacitor HES#3 was disconnected from its power source for measurement of any losses of energy and/or electric charge. Thereafter, the third capacitor HES#3 was placed in storage at room temperature and, during its storage, a continuous recording of its voltage was performed. The third capacitor HES#3 was stored for approximately 70 hours. Immediately after removal from storage, the third capacitor HES#3 was discharged at a constant current of 0.55 A until its voltage reached 0.8V.

The dependence of the voltage of the third capacitor HES#3 on its storage time (see FIG. 15) shows that the rate of decrease of the voltage of the third capacitor HES#3 coincides with the rate of decrease of the voltage of the first exemplary capacitor HES#1.

The discharge of the third capacitor HES#3 after its storage at room temperature for 70 hours revealed that the residual Coulomb capacity and the residual discharge energy of the capacitor were $Q_{res}=2.15$ A·h and $E_{res}=9.91$ kJ, respectively (see Table 1). The loss of energy of the third capacitor HES#3 was $\delta_E=2.69$ kJ, and the value of the loss of the electric charge was $\delta_Q=0.30$ A·h.

The relative losses of energy and electric charge of the third capacitor HES#3 after its storage for 70 hours were 21.3% and 12.2%, respectively. The average rates of loss of energy and electric charge were 1.72 J/(g·h) and 0.69 C/(g·h), respectively. As the average rates of loss of energy and electric charge of the first capacitor HES#1 were 1.83 J/(g·h) and 0.81

C/(g·h), respectively, it can be understood that the use of Hypalon® in the protective film of this embodiment of the current collector of the present invention further reduced the loss of energy and electric charge of the HES.

An examination of the electric, physical and mechanical parameters of the current collectors of the third capacitor HES#3 was performed after completion of cycle testing. This examination revealed that the specific surface resistances of sides "a" and "b" of the current collectors with the Hypalon® polymer protective film remained unchanged during testing. Further, no evidence of any change in the structure of the current collector surfaces was found.

From the stable values of internal resistance, discharge energy and impedance, as well as the low value of self-discharge exhibited by the third capacitor HES#3, it can be concluded that current collectors of the present invention based on graphite foil coated with a protective film including conducting Hypalon® polymer produce stable operating parameters when used in a HES. The results obtained during testing of the third capacitor HES#3 evidence the fact that graphite foil current collectors with a protective film based on conducting Hypalon® polymer can be successfully used in the manufacture of HES' of different designs.

Example 3

Due to the fact that fluoroplastic material has an extremely high chemical stability and stable parameters in different electrolytes (including aqueous sulfuric acid electrolyte), LF-32LN varnish based on soluble fluoroplastic was used to protect graphite foil current collectors in another exemplary embodiment of the present invention. The mass composition of the LF-32LN fluoroplastic varnish was 12% fluoroplastic and 88% solvent. The viscosity of LF-32LN varnish was 68 cP (according to a Brookfield RVDV-III viscosimeter).

A protective film paste was again manufactured as earlier described. The mass composition of the paste was 3.5% industrial carbon powder (P267E), 96.35% LF-32LN varnish, and 0.15% dispersant (Texaphor P61). After preparation and filtration, the paste had a viscosity of 95 cP (according to a Brookfield RVDV-III viscosimeter). Measurements of the specific resistance and type of conductivity of an approximately 12 μm thick reference film (without a substrate) made from the paste showed that the specific electric resistance of the film was 1.06 Ohm·cm and that the film had p-type conductivity.

Current collector bases were again cut from graphite foil and had parameters and overall dimensions substantially identical to those set forth in Example 1.

Growing of a protective film on the surface of the current collector bases was performed in the manner described in Example 1. The time of the exposure of the current collectors to the paste was 24 hours and the rate of the protective film growth (paste level reduction) was 1.2 cm/min. Following the completion of protective film growth, the current collectors were exposed in the air at room temperature for 8 hours and, thereafter, additional protection of sections of the current collector lugs was performed. The lug sections were treated with the LF-32LN varnish, applied thereto with a brush.

After application of the varnish to the lugs, the current collectors were exposed in the air at room temperature for 24 hours and, thereafter, subjected to thermal treatment at a temperature of about 150° C. for 150 minutes.

The electric parameters of $\rho a$ and $\rho b$ of the manufactured current collectors had an even distribution along the surfaces of the current collectors and their value was $\rho a=\rho b=0.015 Ohm·cm^2$. The thicknesses of the protective films of the current collectors and the additional protective layer applied to the lugs of the current collectors were about 5 μm and 20 μm, respectively.

A fourth exemplary HES was manufactured with a negative electrode having current collectors of this construction. This fourth capacitor HES#4 was otherwise designed like the first capacitor HES#1. The fourth capacitor HES#4 again makes use of two carbon plates of PAC-MM-221 material, with overall dimensions of approximately 135 mm×72 mm×2.0 mm and an aggregate mass of 22.6 g. The specific (by mass) electric capacity, mass density and specific electric resistance of the PAC-MM-221 carbon plates was 618 F/g, 0.56 g/cm$^3$ and 2.4 Ohm·cm, respectively. The carbon plates had p-type conductivity.

The fourth capacitor HES#4 was subjected to cycle testing as described in Example 2. At the beginning of testing, five preliminary charge/discharge cycles of the fourth capacitor HES#4 were performed for stabilization and identification of its parameters. After the five preliminary charge-discharge cycles, the fourth capacitor HES#4 had a measured electric capacitance of 7.14 kF. The Coulomb capacity of the fourth capacitor HES#4 during discharge to a voltage of 0.8V was 2.24 A·h. The internal resistances of the fourth capacitor HES#4 were $R_{BD}$=57.1 mOhm and $R_{ED}$=39.3 mOhm.

Figure 11:
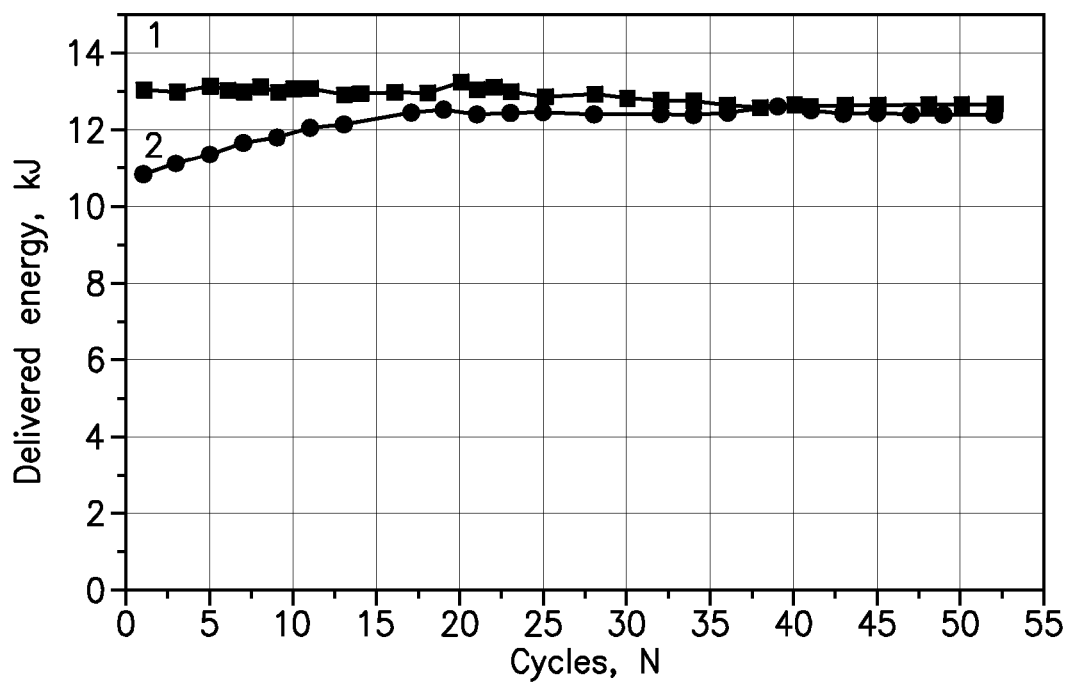
FIG. 11 graphically illustrates the dependence of discharge energy of a third and fourth exemplary HES on the number (N) of their charge/discharge cycles.
Figure 12:
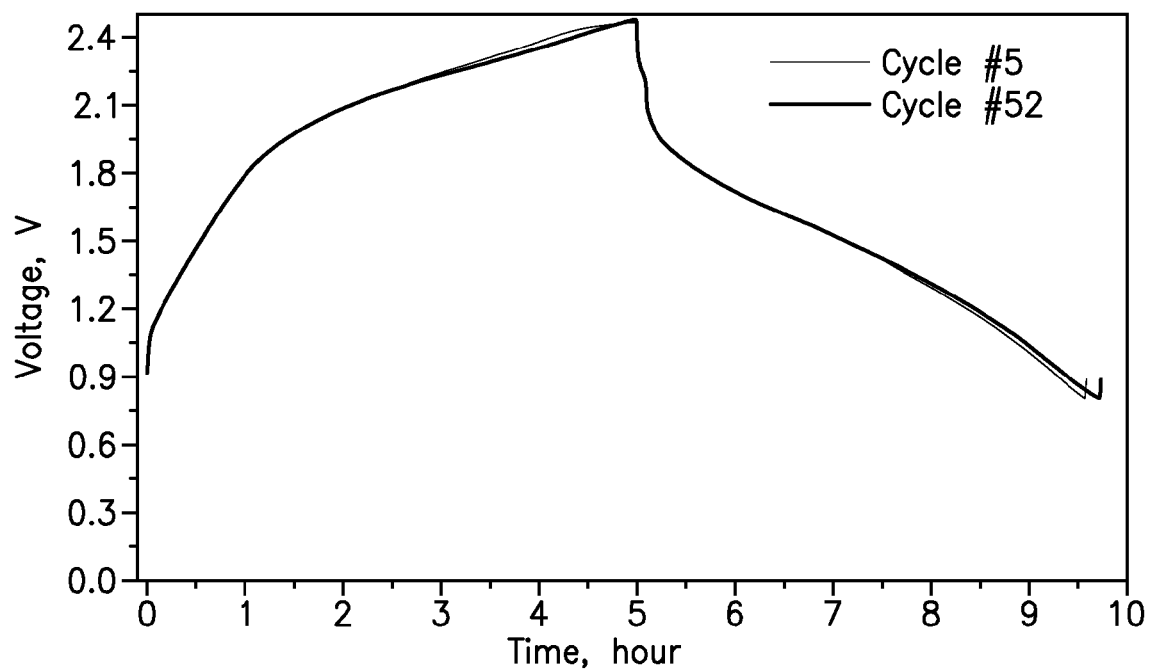
FIG. 12 graphically depicts the dependence of the voltage of the third HES on the time of various charge-discharge cycles.

Results from cycle testing of the fourth capacitor HES#4 that the capacitor delivered 11.0 kJ of energy during its initial discharge cycles. As can be seen in FIG. 11, curve 2, the value of the discharge energy of the fourth capacitor HES#4 in the initial phase of its testing slowly grew until the 17$^{th}$ charge-discharge cycle (at which point it was at 12.4 kJ) and, thereafter, remained stable until the 52$^{nd}$ cycle. The delivered energy of the fourth capacitor HES#4 at the 52$^{nd}$ charge-discharge cycle was 12.35 kJ.

The value of the internal resistance of the fourth capacitor HES#4 at the end of discharge ($R_{ED}$) was unchanged (see FIG. 13, curve 4). Slight variations in the value $R_{ED}$ of the fourth capacitor HES#4 were measured but are related to a change in ambient temperature during continuous cycle testing. As shown in FIG. 13, curve 3, the value of resistance at the beginning of discharge $R_{BD}$ slowly grew from 57.1 mOhm at the beginning of testing to 64.1 mOhm at the 20$^{th}$ charge-discharge cycle. After the 20$^{th}$ cycle, the value of $R_{BD}$ slowly decreased and at the end of the testing was 52.0 mOhm. Since the resistance (as well as impedance |Z|) of a HES depends primarily on its state of charge, the slight increase in $R_{ED}$ seen at the end of the charge process can be attributed to the increase in the voltage of the capacitor.

Figure 14B:
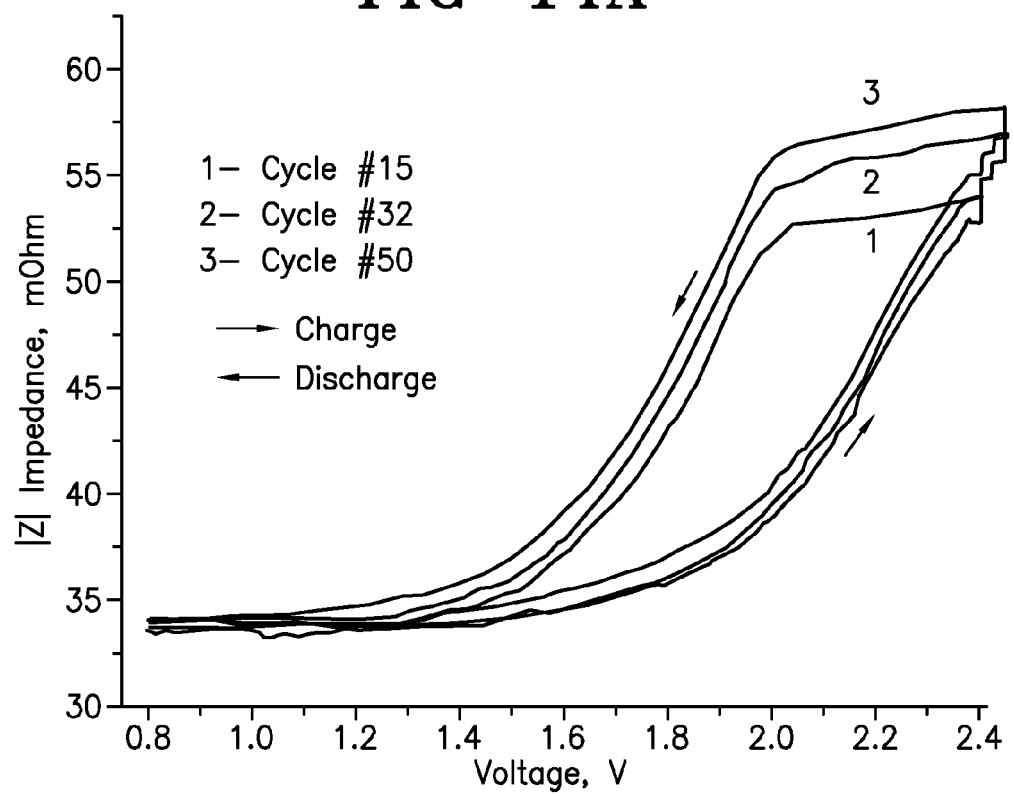

The dependence of the impedance |Z| at the end of discharge of the fourth capacitor HES#4 on the voltage during its different charge-discharge cycles did not change during cycle testing (FIG. 14b). It should be noted that the value of impedance |Z| at the beginning of discharge slowly grew between the 1$^{st}$ and 20$^{th}$ cycles and, thereafter, became stable. Such test results are consistent with the changes of the internal resistances of the fourth capacitor HES#4 at the end of discharge and at the beginning of discharge during cycle testing. This, in turn, further illustrates the excellent stability and parameters of the current collectors of the present invention.

After testing of the fourth capacitor HES#4 over 52 cycles, the capacitor was charged, disconnected from its power supply, and placed in storage at room temperature for the purpose of measuring any losses of energy and/or electric charge thereof during storage. The storage conditions associated with the fourth capacitor HES#4 were substantially the same as those disclosed in Example 1. The fourth capacitor HES#4 was stored for about 70 hours. The dependence of the voltage of the fourth capacitor HES#4 on its time in storage can be reviewed in FIG. 15. As shown, the voltage of the fourth capacitor HES#4 decreased at the same rate as the voltage of the first capacitor HES#1 and the third capacitor HES#3.

Figures 15, 16:
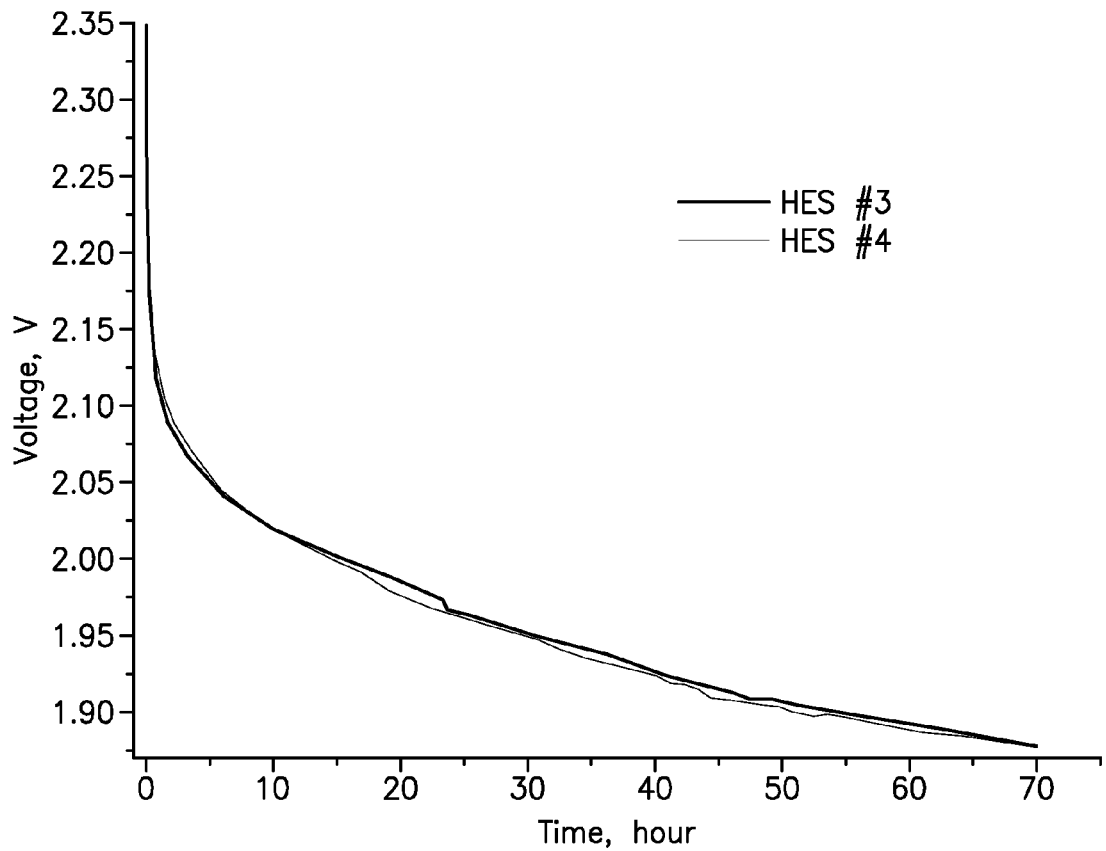
FIG. 15 graphically illustrates the dependence of the voltages of the third and fourth HES capacitors on their time of storage at room temperature.
FIG. 16 is a table comparing various parameters of four exemplary HES' of the present invention.

Discharge of the fourth capacitor HES#4 capacitor after its storage at room temperature for 70 hours, revealed that the residual Coulomb capacity of the capacitor had a value of $Q_{res}=2.12$ A·h, and that the residual discharge energy was $E_{res}=9.94$ kJ (see Table 1 of FIG. 16). The losses of energy and electric charge of the fourth capacitor HES#4 were $\delta E=2.37$ kJ and $\delta Q=0.28$ A·h. The relative losses of energy and electric charge of the fourth capacitor HES#4 after its storage for 70 hours were 19.25% and 11.7%, respectively. The average rates of the loss of energy and electric charge were 1.498 J/(g·h) and 0.637 C/(g·h), respectively. Since the average rates of the loss of energy and charge of the first capacitor HES#1 were 1.83 J/(g·h) and 0.81 C/(g·h), respectively, it is clear that current collectors of the present invention having a protective film based on LFU-32LN conducting fluoroplastic varnish provide for reduced capacitor self-discharge in comparison to the current collectors based on the PVC conducting polymer of the first capacitor HES#1.

When testing of the fourth capacitor's HES#4 parameters was completed, the capacitor was disassembled to allow for examination of the electrical, physical and mechanical parameters of its current collectors. Examination of the electric parameters and the surfaces of the working and free sides of the current collectors of the fourth capacitor HES#4 showed that the specific surface resistances of sides "a" and "b" of the current collectors were unchanged after testing. Furthermore, there were no structural changes to the surfaces of the current collectors.

The stable internal resistances, discharge energy and impedances, as well as the low value of self-discharge of the fourth capacitor HES#4 during cycle testing illustrate that this embodiment of the current collector of the present invention produces stable operating parameters when used in a HES. Consequently, such current collectors may be successfully used in the manufacture of HES' of different designs and applications.

As amply demonstrated by the above examples, variations of the basic concept of the present invention are possible without departing from the scope thereof. As such, while certain embodiments of the present invention are described in detail above, the scope of the invention is not to be considered limited by such disclosure, and modifications are possible without departing from the spirit of the invention as evidenced by the following claims:

What is claimed is:

1. A current collector for use in an electric double layer electrochemical capacitor having an electrode with a carbon-based active mass and a sulfuric acid electrolyte, comprising:
    a current collector basis made from a conductive carbon-based active material of p-type conductivity that exhibits electrophysical parameters that are similar to the electrophysical parameters of the active mass of the electrode; and
    a protective film encapsulating at least a portion of said current collector basis and filling the pores thereof, the protective film having a p-type conductivity and comprising a conductive composite material made from a conductive carbon powder and an organic polymer;
    wherein, due to said similar electrophysical parameters, a homojunction occurs in the area of contact between the active mass of the electrode and said current collector.

2. The current collector of claim 1, wherein said current collector basis is made of a graphite foil.

3. The current collector of claim 2, wherein said graphite foil is made from a graphite powder(s) that is stable in an aqueous sulfuric acid electrolyte.

4. The current collector of claim 1, wherein said organic polymer is selected from the group consisting of perchlorovinyl, chlorosulphated polyethylene, and fluorine-containing polymers.

5. The current collector of claim 1, wherein said organic polymer further includes one or more materials selected from the group consisting of a plasticizer(s), a solvent(s), a dispersant, and a wetting agent(s).

6. The current collector of claim 1, wherein said protective film encapsulates said current collector basis except a lug and a terminal portion thereof.

7. The current collector of claim 1, further comprising a coating of polymer material that provides a high ionic resistance to prevent the transfer of electrolyte ions to the volume of said current collector during charging and discharge of said capacitor and covers a lug portion of said current collector basis.

8. The current collector of claim 7, wherein said polymer is an organic polymer providing p-type conductivity.

9. The current collector of claim 7, wherein the thickness of said polymer material coating is between about 15 μm and about 40 μm.

10. The current collector of claim 1, wherein said carbon powder of said protective film has a particle size that is less than or equal to about 500 nm.

11. The current collector of claim 1, wherein the thickness of said protective film is between about 5 μm and about 15 μm.

12. The current collector of claim 1, wherein the specific electrical resistance of said protective film is less than approximately 5.1 Ohm·cm.

13. The current collector of claim 1, wherein the specific electric resistance of said protective film is between about 1.0 Ohm·cm and about 5.0 Ohm·cm.

14. A current collector for use in an electric double layer electrochemical capacitor having an electrode with a carbon-based active mass and a sulfuric acid electrolyte, comprising:
    a current collector basis made from a graphite foil having p-type conductivity and exhibiting electrophysical parameters that are similar to the electrophysical parameters of the active mass of the electrode;
    a protective film encapsulating and filling the pores of said graphite foil basis except a lug and a terminal portion thereof, wherein said protective film has p-type conductivity and comprises a conductive composite material made from a conducting carbon powder and an organic polymer; and
    an organic polymer material providing high ionic resistance to prevent the transfer of electrolyte ions to the volume of said current collector during charging and discharge of said capacitor covering a lug portion of said current collector basis;
    wherein, due to said similar electrophysical parameters, a homojunction occurs in the area of contact between the active mass of the electrode and said current collector.

15. The current collector of claim 14, wherein said graphite foil is made from a graphite powder(s) that is stable in an aqueous sulfuric acid electrolyte.

16. The current collector of claim 14, wherein said organic polymer is selected from the group consisting of perchlorovinyl, chlorosulphated polyethylene, and fluorine-containing polymers.

17. The current collector of claim 14, wherein said organic polymer further includes one or more materials selected from the group consisting of a plasticizer(s), a solvent(s), a dispersant, and a wetting agent(s).

18. The current collector of claim 14, wherein said carbon powder of said protective film has a particle size that is less than or equal to about 500 nm.

19. The current collector of claim 14, wherein the thickness of said protective film is between about 5 μm and about 15 μm.

20. The current collector of claim 14, wherein the thickness of said organic polymer material is between about 15 μm and about 40 μm.

21. The current collector of claim 14, wherein the specific electrical resistance of said protective film is less than approximately 5.1 Ohm·cm.

\* \* \* \* \*